(12) United States Patent
Seo et al.

(10) Patent No.: US 8,734,916 B2
(45) Date of Patent: *May 27, 2014

(54) OPTICAL DEVICE

(75) Inventors: Eun Mi Seo, Daejeon (KR); Sin Young Kim, Daejeon (KR); Kyun Il Rah, Daejeon (KR); Moon Soo Park, Daejeon (KR); Seung Hun Chae, Daejeon (KR)

(73) Assignee: LG Chem Ltd., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 13/464,736

(22) Filed: May 4, 2012

(65) Prior Publication Data

US 2012/0257128 A1  Oct. 11, 2012

Related U.S. Application Data

(63) Continuation-in-part of application No. PCT/KR2011/008596, filed on Nov. 10, 2011.

(30) Foreign Application Priority Data

| Nov. 10, 2010 | (KR) | 10-2010-0111757 |
| Nov. 10, 2010 | (KR) | 10-2010-0111758 |
| Dec. 7, 2010 | (KR) | 10-2010-0124411 |
| Jun. 15, 2011 | (KR) | 10-2011-0057830 |
| Oct. 26, 2011 | (KR) | 10-2011-0110092 |
| Oct. 26, 2011 | (KR) | 10-2011-0110093 |
| Oct. 26, 2011 | (KR) | 10-2011-0110096 |
| Nov. 10, 2011 | (KR) | 10-2011-0117226 |

(51) Int. Cl.
 *G02F 1/1333* (2006.01)
 *G02F 1/1335* (2006.01)
 *C09K 19/38* (2006.01)
 *C09K 19/54* (2006.01)
 *G02B 5/30* (2006.01)
 *G02B 27/22* (2006.01)
 *G02B 27/26* (2006.01)

(52) U.S. Cl.
 USPC ......... 428/1.1; 428/1.31; 428/1.51; 428/1.52; 428/1.53; 428/1.55; 349/15; 349/183

(58) Field of Classification Search
 USPC ............... 428/1.1, 1.31, 1.5, 1.52, 1.53, 1.55; 349/15, 183
 See application file for complete search history.

(56) References Cited

U.S. PATENT DOCUMENTS

| 8,647,726 B2 * | 2/2014 | Seo et al. ............. 428/1.5 |
| 2008/0170294 A1 * | 7/2008 | Kuroda et al. .......... 359/500 |
| 2008/0252973 A1 * | 10/2008 | Akari et al. ............ 359/485 |
| 2012/0257129 A1 * | 10/2012 | Seo et al. ............. 349/15 |
| 2012/0262639 A1 * | 10/2012 | Kim et al. ............ 349/15 |
| 2013/0027620 A1 * | 1/2013 | Kim et al. ............ 349/15 |
| 2013/0083262 A1 * | 4/2013 | Kim et al. ............ 349/15 |

* cited by examiner

*Primary Examiner* — Shean C Wu
(74) *Attorney, Agent, or Firm* — McKenna, Long & Aldridge, LLP.

(57) ABSTRACT

An optical device and a stereoscopic image display device are provided. The optical device according to one embodiment may be a light-dividing device, for example, a device that can divide incident light into at least two kinds of light having different polarized states. For example, the optical device can be used to realize a stereoscopic image.

21 Claims, 10 Drawing Sheets

FIG. 3

| A | B | A | B | A | B |
|---|---|---|---|---|---|
| B | A | B | A | B | A |
| A | B | A | B | A | B |
| B | A | B | A | B | A |
| A | B | A | B | A | B |
| B | A | B | A | B | A |

FIG. 10

| LG | RG | LG | RG | LG | RG |
|----|----|----|----|----|----|
| RG | LG | RG | LG | RG | LG |
| LG | RG | LG | RG | LG | RG |
| RG | LG | RG | LG | RG | LG |
| LG | RG | LG | RG | LG | RG |
| RG | LG | RG | LG | RG | LG |

OPTICAL DEVICE

CROSS-REFERENCE TO RELATED APPLICATION

This application is a Continuation-In-Part application (by-pass application), under 35 USC §120, of International Patent Application No. PCT/KR2011/008596, filed on Nov. 10, 2011, which claims priority to and the benefit of Korean Patent Application Nos. 10-2010-0111757, filed on Nov. 10, 2010, 10-2010-0111758, filed on Nov. 10, 2010, 10-2010-0124411, filed on Dec. 7, 2010, 10-2011-0057830, filed on Jun. 15, 2011, 10-2011-0110092, filed on Oct. 26, 2011, 10-2011-0110093, filed on Oct. 26, 2011, 20-2011-0110096, filed on Oct. 26, 2011, and 10-2011-0117226, filed on Nov. 10, 2011, which are all hereby incorporated by reference in their entirety herein.

BACKGROUND

1. Field of the Invention

This application relates to an optical device and a stereoscopic image display device.

2. Discussion of Related Art

Light division techniques relate to dividing light into at least two kinds of light having different polarizations and have been used in various fields.

The light division techniques may be, for example, applied to form stereoscopic images. The stereoscopic images may be formed using binocular parallax. For example, if two 2-dimensional images are input into the human left and right eyes, respectively, the input information is transmitted to and combined in the brain, it becomes possible for a human being to experience 3-dimensional (3D) senses of depth and reality. During this process, the light division techniques may be used.

Techniques to form the stereoscopic image may be effectively used for 3D measurements, and also used in 3D TV, cameras or computer graphics.

SUMMARY

This application provides an optical device and a stereoscopic image display device.

One aspect of this application is related to an optical device. In one embodiment, the optical device may include a polarizer and a liquid crystal layer. The optical device may also include an adhesive layer that attaches the polarizer and the liquid crystal layer.

The adhesive layer may include an active energy ray-curable adhesive composition. The active energy ray-curable adhesive composition may include a cationically polymerizable compound. In one embodiment, the active energy ray-curable adhesive composition may be included in the adhesive layer in a cured state. The term "curing of an adhesive composition or of a pressure-sensitive adhesive composition" as used herein may refer to a process for the composition to express an adhesive property or pressure-sensitive adhesive property through a physical or chemical action or reaction of a component included in the composition. The term "active energy ray-curable composition" as used herein may refer to a composition whose curing may be induced by irradiation with active energy rays. The term "active energy rays" as used herein may include particle beams such as alpha-particle beams, proton beams, neutron beams or electron beams, as well as microwaves, infrared rays (IR), ultraviolet rays (UV), X rays and gamma rays. Generally, the UV rays or electron beams may be used herein.

The adhesive composition may include a cationically polymerizable compound. The adhesive composition may be, for example, an adhesive composition which may be cured by a cationic polymerization reaction caused by irradiation with active energy rays.

Examples of the cationically polymerizable compound may include a cationically polymerizable epoxy compound, a vinyl ether compound, an oxetane compound, an oxolane compound, a cyclic acetal compound, a cyclic lactone compound, a thiirane compound, a thiovinylether compound, a spirortho ester compound, an ethylenically unsaturated compound, a cyclic ether compound or a cyclic thioether compound. In one embodiment, a cationically polymerizable epoxy compound may be used as the cationically polymerizable compound.

Examples of the cationically polymerizable epoxy compound may include at least one compound selected from the group consisting of an aromatic epoxy compound, an alicyclic epoxy compound or an aliphatic epoxy compound. The above compounds may be used alone or in combination with other compounds.

In one embodiment, the cationically polymerizable compound may include both of the alicyclic epoxy compound and the aliphatic epoxy compound.

The term "alicyclic epoxy compound" as used herein may refer to a compound including at least one alicyclic epoxy group. The term "alicyclic epoxy group" as used herein may refer to a functional group having an aliphatic saturated hydrocarbon ring, and two carbon atoms among the carbon atoms constituting the hydrocarbon ring also constitute an epoxy group.

Examples of the alicyclic epoxy compound may include an epoxycyclohexylmethyl epoxycyclohexanecarboxylate compound; an epoxycyclohexane carboxylate compound of alkanediol; an epoxycyclohexylmethyl ester compound of dicarboxylic acid; an epoxycyclohexylmethyl ether compound of polyethyleneglycol; an epoxycyclohexylmethyl ether compound of alkanediol; a diepoxytrispiro compound; a diepoxymonospiro compound; a vinylcyclohexene diepoxide compound; an epoxycyclopentyl ether compound; or a diepoxy tricyclo decane compound. Examples of the compounds may include compounds represented by the following Formulas 1 to 10, respectively.

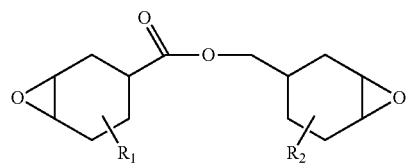

Formula 1

In Formula 1, $R_1$ and $R_2$ each independently represent hydrogen or an alkyl group.

Formula 2

In Formula 2, $R_3$ and $R_4$ each independently represent hydrogen or an alkyl group, and n represents an integer ranging from 2 to 20.

Formula 3

In Formula 3, $R_5$ and $R_6$ each independently represent hydrogen or an alkyl group, and p represents an integer ranging from 2 to 20.

Formula 4

In Formula 4, $R_7$ and $R_8$ each independently represent hydrogen or an alkyl group, and q represents an integer ranging from 2 to 20.

Formula 5

In Formula 5, $R_9$ and $R_{10}$ each independently represent hydrogen or an alkyl group, and r represents an integer ranging from 2 to 20.

Formula 6

In Formula 6, $R_{11}$ and $R_{12}$ each independently represent hydrogen or an alkyl group.

Formula 7

In Formula 7, $R_{13}$ and $R_{14}$ each independently represent hydrogen or an alkyl group.

Formula 8

In Formula 8, $R_{15}$ represents hydrogen or an alkyl group.

Formula 9

In Formula 9, $R_{16}$ and $R_{17}$ each independently represent hydrogen or an alkyl group.

Formula 10

In Formula 10, $R_{18}$ represents hydrogen or an alkyl group.

Unless defined otherwise, the term "alkyl group" as used herein may refer to a linear, branched or cyclic, substituted or unsubstituted alkyl group having 1 to 20 carbon atoms, 1 to 16 carbon atoms, 1 to 12 carbon atoms, 1 to 8 carbon atoms or 1 to 4 carbon atoms. Also, in this document, examples of the substituent that may be substituted with a certain functional group may include an alkyl group, an alkoxy group, an alkenyl group, an epoxy group, a cyano group, a carboxyl group, an acryloyl group, a methacryloyl group, an acryloyloxy group, a methacryloyloxy group or an aryl group, but is not limited thereto.

In one embodiment, as the alicyclic epoxy compound, epoxycyclohexylmethyl epoxycyclohexane carboxylate compound, epoxycyclohexane carboxylate compound of alkanediol, epoxycyclohexylmethyl ester compound of dicarboxylic acid or epoxycyclohexylmethyl ether compound of alkanediol may be used. Specifically, the alicyclic epoxy compound that may be used herein may include at least one selected from the group consisting of an esterification product (a compound in which $R_1$ and $R_2$ in Formula 1 are hydrogen) of 7-oxabicyclo[4,1,0]heptane-3-carboxylic acid and (7-oxabicyclo[4,1,0]hepto-3-yl)methanol; an esterification product (a compound in which $R_1$ in Formula 1 is 4-$CH_3$ and $R_2$ is 4-$CH_3$) of 4-methyl-7-oxabicyclo[4,1,0]heptane-3-carboxylic acid and (4-methyl-7-oxa-bicyclo[4,1,0]hepto-3-yl) methanol; an esterification product (a compound in which $R_3$ and $R_4$ in Formula 2 are hydrogen and n is 1) of 7-oxabicyclo [4,1,0]heptane-3-carboxylic acid and 1,2-ethanediol; an esterification product (a compound in which $R_5$ and $R_6$ in Formula 3 are hydrogen and p is 2) of (7-oxabicyclo[4,1,0] hepto-3-yl)methanol and adipic acid; an esterification product (a compound in which $R_5$ and $R_6$ in Formula 3 are 4-$CH_3$ and p is 2) of (4-methyl-7-oxabicyclo[4,1,0]hepto-3-yl) methanol and adipic acid; and an etherification product (a compound in which $R_9$ and $R_{10}$ in Formula 5 are hydrogen and r is 1) of (7-oxabicyclo[4,1,0]hepto-3-yl)methanol and 1,2-ethanediol.

In one embodiment, a difunctional epoxy compound, i.e., a compound having two epoxy groups may be used as the alicyclic epoxy compound, and a compound in which both of the two epoxy groups are alicyclic epoxy groups may be used, but is not limited thereto.

The aliphatic epoxy compound may be, for example, an epoxy compound having an aliphatic epoxy group that is not the alicyclic epoxy group. Examples of the aliphatic epoxy compound may include polyglycidyl ether of aliphatic polyvalent alcohol; a polyglycidyl ether of an alkyleneoxide addition product of aliphatic polyvalent alcohol; a polyglycidyl ether of polyester polyol of aliphatic polyvalent alcohol and aliphatic polyvalent carboxylic acid; a polyglycidyl ether of aliphatic polyvalent carboxylic acid; a polyglycidyl ether of polyester polycarboxylic acid of aliphatic polyvalent alcohol and aliphatic polyvalent carboxylic acid; a dimer, oligomer or polymer obtained by vinyl polymerization of glycidyl acrylate or glycidyl methacrylate; or an oligomer or polymer obtained by vinyl polymerization of the glycidyl acrylate or glycidyl methacrylate, and other vinyl monomer. In one embodiment, polyglycidyl ether of an aliphatic polyvalent alcohol or an alkyleneoxide addition product of the aliphatic polyvalent alcohol may be used, but is not limited thereto.

In the above, the aliphatic polyvalent alcohol may, for example, be an aliphatic polyvalent alcohol having 2 to 20 carbon atoms, 2 to 16 carbon atoms, 2 to 12 carbon atoms, 2 to 8 carbon atoms or 2 to 4 carbon atoms. For example, the aliphatic polyvalent alcohol may include an aliphatic diol such as ethyleneglycol, 1,2-propanediol, 1,3-propanediol, 2-methyl-1,3-propanediol, 2-butyl-2-ethyl-1,3-propanediol, 1,4-butanediol, neopentylglycol, 3-methyl-2,4-pentanediol, 2,4-pentanediol, 1,5-pentanediol, 3-methyl-1,5-pentanediol, 2-methyl-2,4-pentanediol, 2,4-diethyl-1,5-pentanediol, 1,6-hexanediol, 1,7-heptanediol, 3,5-heptanediol, 1,8-octanediol, 2-methyl-1,8-octanediol, 1,9-nonanediol, or 1,10-decanediol; an alicyclic diol such as cyclohexanedimethanol, cyclohexanediol, hydrogenated bisphenol A, or hydrogenated bisphenol F; trimethylolethane, trimethylolpropane, a hexitol, a pentitol, glycerin, polyglycerin, pentaerythritol, dipentaerythritol, or tetramethylolpropane.

In the above, the alkyleneoxide may be, for example, an alkyleneoxide having 1 to 20 carbon atoms, 1 to 16 carbon atoms, 1 to 12 carbon atoms, 1 to 8 carbon atoms or 1 to 4 carbon atoms. For example, ethyleneoxide, propyleneoxide or butyleneoxide may be used herein.

In the above, examples of the aliphatic polyvalent carboxylic acid may also include oxalic acid, malonic acid, succinic acid, glutaric acid, adipic acid, pimelic acid, suberic acid, azelaic acid, sebacic acid, dodecanedioic acid, 2-methylsuccinic acid, 2-methyladipic acid, 3-methyladipic acid, 3-methylpentanedioic acid, 2-methyloctanedioic acid, 3,8-dimethyldecanedioic acid, 3,7-dimethyldecanedioic acid, 1,20-eicosamethylenedicarboxylic acid, 1,2-cyclopentanedicarboxylic acid, 1,3-cyclopentanedicarboxylic acid, 1,2-cyclohexanedicarboxylic acid, 1,3-cyclohexanedicarboxylic acid, 1,4-cyclohexanedicarboxylic acid, 1,4-dicarboxymethylenecyclohexane, 1,2,3-propanetricarboxylic acid, 1,2,3,4-butanetetracarboxylic acid, or 1,2,3,4-cyclobutanetetracarboxylic acid, but is not limited thereto.

In one embodiment, a compound that does not include the alicyclic epoxy group and that includes at least three epoxy groups, for example three epoxy groups, may be used as the aliphatic epoxy compound when considering a curing property, weather resistance and refractive index, but is not limited thereto.

Examples of the aromatic epoxy compound that may be used herein may include an epoxy compound containing an aromatic group in its molecule, for example, a bisphenol-type epoxy resin such as bisphenol A epoxy, bisphenol F epoxy, bisphenol S epoxy or brominated bisphenol epoxy; a novolac-type epoxy resin such as phenol novolac epoxy resin or cresol novolac epoxy resin; a cresol epoxy resin or a resorcinol glycidyl ether.

In one embodiment, the adhesive composition may further include a silane compound having a cationically polymerizable functional group. The silane compound may be properly used to adjust a surface energy of the adhesive and improve adhesion strength, if necessary. For example, a compound represented by the following Formula 11 may be used as the silane compound.

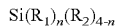  Formula 11

In Formula 11, $R_1$ is a cationically polymerizable functional group bound to the silicon atom, $R_2$ is a functional group bound to the silicon atom, and may be hydrogen, a hydroxyl group, an alkyl group or an alkoxy group, and n may be a number ranging from 1 to 4.

Examples of the cationically polymerizable functional group may include an alkenyl group such as a vinyl group, a cyclic ether group such as a glycidyl group or an oxetanyl group, or a vinyloxy group, or may include a functional group including the cyclic ether group, vinyloxy group or alkenyl group.

In the Formula 11, the alkoxy group may be, for example, an alkoxy group having 1 to 20 carbon atoms, 1 to 16 carbon atoms, 1 to 12 carbon atoms, 1 to 8 carbon atoms or 1 to 4 carbon atoms. The alkoxy group may be linear, branched or cyclic, and may also be substituted or unsubstituted with one or more substituents.

In Formula 11, n may be, for example, 1 or 2.

Examples of the compound of Formula 11 may include 2-(3,4-epoxycyclohexyl)ethyl trimethoxy silane, 3-glycidoxypropyl trimethoxy silane, glycidoxypropyl methyldiethoxy silane, glycidoxypropyl triethoxy silane, vinyltrimethoxysilane or vinyltriethoxysilane, but is not limited thereto.

In one embodiment, an oligomeric silane compound that is a silicon resin which has a relatively low molecular weight and of which both ends of a molecular chain are blocked by alkoxysilyl groups and to which the cationically polymerizable functional group is introduced may also be used as the silane compound.

The adhesive composition may include the silane compound in an amount of 0.1 parts by weight to 10 parts by weight, or 0.1 parts by weight to 5 parts by weight, relative to 100 parts by weight of the cationically polymerizable compound. The adhesive layer may exhibit suitable surface energy and adhesive property within the above amounts of the silane compound. Unless defined otherwise, the unit "part(s) by weight" may refer to a weight ratio of components.

The adhesive composition may further include a cationic initiator as a component for initiating the curing reaction. In one embodiment, a cationic photoinitiator, which may release a component capable of initiating cationic polymerization when being irradiated with active energy rays, may be used as the cationic initiator.

In one embodiment, the cationic photoinitiator that may be used herein may include an ionized cationic initiator such as onium salt or organometallic salt, or a non-ionized cationic photoinitiator such as organic silane or latent sulfonic acid or other non-ionized compounds. Examples of the onium salt initiator may include a diaryliodonium salt, a triarylsulfonium salt or an aryldiazonium salt, examples of the organometallic salt initiator may include iron arene, examples of the organic silane initiator may include o-nitrobenzyl triaryl silyl ether, triaryl silyl peroxide or acyl silane, and examples of the latent sulfonic acid initiator may include α-sulfonyloxy ketone or α-(hydroxymethyl)benzoin sulfonate, but is not limited thereto. Also, a mixture of the iodine-based initiator and the photosensitizer may be used as the cationic initiator.

In one embodiment, the ionized cationic photoinitiator may be used as the cationic initiator. The inonized cationic photoinitiator may be the onium salt ionized cationic photoinitiator, or may be the triarylsulfonium salt ionized cationic photoinitiator, but is not limited thereto.

For example, the adhesive composition may include the cationic initiator in an amount of 0.01 parts by weight to 20 parts by weight, 0.01 parts by weight to 10 parts by weight, or 0.01 parts by weight to 5 parts by weight, relative to 100 parts by weight of the cationically polymerizable compound, but this amount may be varied in consideration of the curing efficiency.

The adhesive composition may further include a cationically polymerizable oxetane compound along with the epoxy compound, if necessary, in order to improve close adhesion after curing.

The oxetane compound is a compound having a 4-membered cyclic ether group in its molecule structure. Examples of the oxetane compound may include 3-ethyl-3-hydroxymethyl oxetane, 1,4-bis[(3-ethyl-3-oxetanyl)methoxymethyl] benzene, 3-ethyl-3-(phenoxymethyl)oxetane, di[(3-ethyl-3-oxetanyl)methyl]ether, 3-ethyl-3-(2-ethylhexyloxymethyl) oxetane or phenol novolac oxetane. In one embodiment, as the oxetane compound, "ARON OXETANE OXT-101," "ARON OXETANE OXT-121," "ARON OXETANE OXT-211," "ARON OXETANE OXT-221" or "ARON OXETANE OXT-212," which is commercially available from Toagosei Co., Ltd, may be used.

The adhesive composition may include the oxetane compound, for example, in an amount of 10 parts by weight to 60 parts by weight or 20 parts by weight to 50 parts by weight, relative to 100 parts by weight of the cationically polymerizable compound. However, the amount of the oxetane compound may be varied in consideration of desired physical properties.

The adhesive composition may further include a photosensitizer. Examples of the photosensitizer may include an anthracene compound, a pyrene compound, a carbonyl compound, an organic sulfur compound, a persulfide, a reduction-oxidation (redox) compound, an azo or diazo compound, a halogen compound or a photoreductive pigment. For example, the photosensitizer may be used in an amount of 10 parts by weight or less, relative to 100 parts by weight of the cationically polymerizable components included in the composition.

Examples of the photosensitizer may include an anthracene compound represented by the following Formula 12; pyrene; a benzoin derivative such as benzoin methyl ether, benzoin isopropyl ether or α,α-dimethoxy-α-phenylacetophenone; a benzophenone derivative such as benzophenone, 2,4-dichlorobenzophenone, o-benzoylbenzoic acid methyl, 4,4'-bis(dimethylamino)benzophenone or 4,4'-bis(diethylamino)benzophenone; a thioxanthone derivative such as 2-chlorothioxanthone or 2-isopropylthioxanthone; an anthraquinone derivative such as 2-chloroanthraquinone or 2-methylanthraquinone; an acridone derivative such as N-methylacridone or N-butylacridone; and α,α-diethoxyacetophenone, benzyl, fluorenone, xanthone, a uranyl compound or a halogen compound.

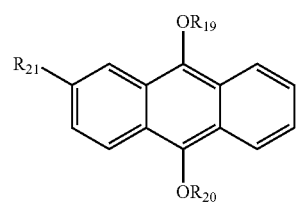

Formula 12

In Formula 12, $R_{19}$ and $R_{20}$ each independently represent an alkyl group or an ether group, and $R_{21}$ represents hydrogen or an alkyl group.

In Formula 12, the alkyl group that may be used in $R_{19}$, $R_{20}$ and $R_{21}$ may include a methyl group, an ethyl group, a propyl group, an isopropyl group, a butyl group, an isobutyl group, an amyl group, an isoamyl group, a hexyl group, a 2-hexyl group, a 3-hexyl group, a cyclohexyl group, a 1-methylcyclohexyl group, a heptyl group, a 2-heptyl group, a 3-heptyl group, an isoheptyl group, an n-octyl group, an isooctyl group, a 2-ethylhexyl group, a nonyl group, an isononyl group, a decyl group, a dodecyl group, a tridecyl group, a tetradecyl group, a pentadecyl group, a hexadecyl group, a heptadecyl group or an octadecyl group.

Also, the ether group that may be used in $R_{19}$ and $R_{20}$ may include an ether group having 2 to 18 carbon atoms such as a 2-methoxyethyl group, a 2-ethoxyethyl group, a 2-butoxyethyl group, a 2-phenoxyethyl group, a 2-(2-methoxyethoxy) ethyl group, a 3-methoxypropyl group, a 3-butoxypropyl group, a 3-phenoxypropyl group, a 2-methoxy-1-methylethyl group, a 2-methoxy-2-methylethyl group, a 2-methoxyethyl group, a 2-ethoxyethyl group, a 2-butoxyethyl group or a 2-phenoxyethyl group. As can be seen from the above, the ether group in Formula 12 may refer to a hydrocarbon group having one or more ether bonds and may include an alkoxyalkyl group, an alkoxyalkoxyalkyl group or an aryloxyalkyl group.

In one embodiment, a compound in which $R_{19}$ and $R_{20}$ in Formula 12 are alkyl groups having 1 to 4 carbon atoms, and $R_{21}$ is hydrogen or an alkyl group having 1 to 4 carbon atoms may be used as the photosensitizer.

The photosensitizer may be used at a proper weight ratio in consideration of desired addition effects.

The adhesive layer may be formed by curing the adhesive composition. In one embodiment, the adhesive composition may be cured by being irradiated with active energy ray so that a cationic polymerization reaction can be initiated. A light source used to irradiate active energy rays is not particularly limited, but a light source capable of irradiating active energy rays having an emission distribution at a wavelength of 400 nm or less may be used. For example, the light source may be a low-pressure, medium-pressure, high-pressure or ultra high-pressure mercury lamp, a chemical lamp, a black light lamp, a microwave-excited mercury lamp or a metal halide lamp. The irradiation intensity of the active energy rays may be determined according to components of the composition. In one embodiment, the irradiation intensity at wavelength regions within which the initiator may be effectively activated may be in a range from 0.1 mW/cm$^2$ to 6,000 mW/cm$^2$, but is not particularly limited thereto. If the irradiation intensity is 0.1 mW/cm$^2$ or more, a reaction time is not too long. If the irradiation intensity is 6,000 mW/cm$^2$ or less, it is possible to prevent yellowing or degradation caused by heat radiated from the light source and heat generated during the curing of the composition. The irradiation time may be adjusted according to a composition to be cured. In one embodiment, the irradiation time may be set so that an integrated light intensity obtained by multiplying the irradiation intensity by the irradiation time may be in a range from 10 mJ/cm$^2$ to 10,000 mJ/cm$^2$, but is not particularly limited thereto. If the integrated light intensity is 10 mJ/cm$^2$ or more, active species derived from the initiator may be maintained at a sufficient amount to securely carry out the curing reaction. If the integrated light intensity is 10,000 mJ/cm$^2$ or less, the irradiation time is not too long, thereby maintaining good productivity.

In one embodiment, the adhesive layer may have a gel fraction of 80% or more, 85% or more or 90% or more. The gel fraction of the adhesive layer may be calculated from the following Equation 2.

$$\text{Gel fraction} = B/A \times 100 \qquad \text{Equation 1}$$

In Equation 1, A represents the weight of the adhesive, and B represents the dry weight of an insoluble part of the adhesive. The insoluble part may be obtained after dipping the adhesive having the weight of A in dimethylformamide at room temperature for 48 hours.

The term "room temperature" as used herein may refer to a naturally unchanged temperature that is not increased and decreased. The room temperature, for example, may be from approximately 10° C. to approximately 30° C., from approximately 20° C. to 25° C., approximately 25° C. or approximately 23° C.

The term "dry weight" of the insoluble part may refer to the weight measured after eliminating the dimethyl formamide that is a solvent by drying the insoluble part that is obtained after dipping in the dimethyl formamide. The drying conditions are not particularly limited, but may be selected to remove substantially completely the solvent in the insoluble part.

Within the above range of the gel fraction, the adhesive layer may have appropriate durability and an adhesive property.

In one embodiment, the adhesive layer may have a glass transition temperature of 40° C. or more, 50° C. or more, 60° C. or more, 70° C. or more, 80° C. or more, or 90° C. or more. An optical device having excellent durability may be provided by attaching the polarizer and the liquid crystal layer by the adhesive having a glass transition temperature within the above range. Also, the adhesive layer having the above ranged glass transition temperature may stably maintain a phase retardation property of the liquid crystal layer. An upper limit of the glass transition temperature is not particularly limited. For example, the upper limit may be approximately 200° C., approximately 150° C. or approximately 120° C.

The adhesive layer may have a thickness of 6 μm or less, 5 μm or less or 4 μm or less. Within the above range, an adhesive property to the liquid crystal layer and a phase retardation property of the liquid crystal layer may be suitably main- tained. A lower limit of the thickness of the adhesive layer may be, for example, 0.1 μm, 0.3 μm or 0.5 μm.

The optical device includes the polarizer and the liquid crystal layer, which are attached to each other by the adhesive layer. FIG. 1 shows a schematic of an illustrative embodiment of the optical device 1. FIG. 1 shows an illustrative structure of the optical device 1 in which a polarizer 12, an adhesive layer 11 and a liquid crystal layer 13 are sequentially formed.

The kind of the polarizer included in the optical device is not particularly limited. For example, a conventional polarizer such as a polyvinyl alcohol polarizer, which is uniaxially or biaxially elongated and to which an iodine or dichroic dye is adsorbed and aligned, may be used as the polarizer. Examples of the polyvinyl alcohol resin of the polarizer may include a gelled polyvinylacetate resin. As the polyvinylacetate resin, a homopolymer of vinyl acetate or a copolymer of vinyl acetate and other comonomer may be used. Examples of the other comonomer may include an unsaturated carboxylic acid, an olefin, a vinylether, an unsaturated sulfonic acid and an acrylamide having an ammonium group. A gelling degree of the polyvinyl alcohol resin may be generally in a range from 85 mol % to 100 mol %, or 98 mol % or more. The polyvinyl alcohol resin may be further modified. For example, aldehyde-modified polyvinyl formal or polyvinylacetal may be used.

In one embodiment, a difference between the refractive index of the liquid crystal layer in the in-plane slow axis direction and the refractive index of the liquid crystal layer in the in-plane fast axis direction may be from 0.05 to 0.2, from 0.07 to 0.2, from 0.09 to 0.2 or from 0.1 to 0.2. The term "refractive index of or in the in-plane slow axis direction" may refer to a refractive index in a direction in which the maximum refractive index is measured in the plane of the liquid crystal layer, and the term "refractive index of or in the in-plane fast axis direction" may refer to a refractive index in a direction in which the minimum refractive index is measured in the plane of the liquid crystal layer. In general, the fast axis and slow axis in an optically anisotropic liquid crystal layer are formed to be vertical to each other. The refractive indexes may be measured with respect to light having a wavelength of 550 nm or 589 nm. The difference between the refractive indexes may be measured according to the method described in the below Examples.

The liquid crystal layer may also have a thickness of approximately 0.5 μm to 2.0 μm or approximately 0.5 μm to 1.5 μm.

The liquid crystal layer satisfying the relationship of the refractive indexes and having the thickness may express a phase retardation property suitable for applied use. In one embodiment, the liquid crystal layer satisfying the relationship of the refractive indexes and having the thickness may be suitable for use in an optical device for light division.

The liquid crystal layer may include a multifunctional polymerizable liquid crystal compound and a monofunctional polymerizable liquid crystal compound. These crystal compounds may be included in a polymerized form in the liquid crystal layer.

The term "multifunctional polymerizable liquid crystal compound" as used herein may refer to a compound that has a liquid crystalline property since it includes a mesogen backbone, and also has two or more polymerizable functional groups. In one embodiment, the multifunctional polymerizable liquid crystal compound may include 2 to 10, 2 to 8, 2 to 6, 2 to 5, 2 to 4, 2 to 3, or 2 polymerizable functional groups.

The term "monofunctional polymerizable liquid crystal compound" as used herein may refer to a compound that has a liquid crystalline property since it includes a mesogen backbone, and has one polymerizable functional group.

Also, the term "polymerizable liquid crystal compound in a polymerized form being included in a liquid crystal layer" may refer to a state where the liquid crystal compound is polymerized so as to form a liquid crystal polymer in the liquid crystal layer.

If the liquid crystal layer includes both of the multifunctional and monofunctional polymerizable compounds, the liquid crystal layer may have more excellent phase retardation properties, and the realized phase retardation properties, for example, the optical axis and a phase retardation value thereof, may be stably maintained even under the severe conditions.

In one embodiment, the polymerizable liquid crystal compound may be a compound represented by the following Formula 13.

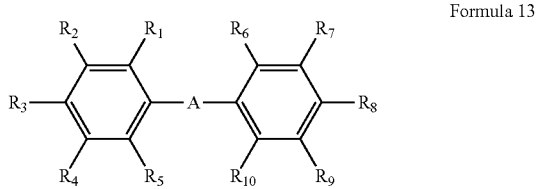

Formula 13

In Formula 13, A may be a single bond, —COO— or —OCO—, and $R_1$ to $R_{10}$ may be each independently hydrogen, a halogen, an alkyl group, an alkoxy group, an alkoxycarbonyl group, a cyano group, a nitro group, —O-Q-P or a substituent represented by the following Formula 14, or a pair of two adjacent substituents among $R_1$ to $R_5$ or a pair of two adjacent substituents among $R_6$ to $R_{10}$ is joined together to form a benzene ring substituted with —O-Q-P, with the proviso that at least one of the $R_1$ to $R_{10}$ is —O-Q-P or a substituent of the Formula 14, or at least one pair of two adjacent substituents among $R_1$ to $R_5$ or among $R_6$ to $R_{10}$ is joined together to form a benzene ring substituted with —O-Q-P, where Q may be an alkylene group or an alkylidene group, and P may be a polymerizable functional group such as an alkenyl group, an epoxy group, a cyano group, a carboxyl group, an acryloyl group, a methacryloyl group, an acryloyloxy group or a methacryloyloxy group.

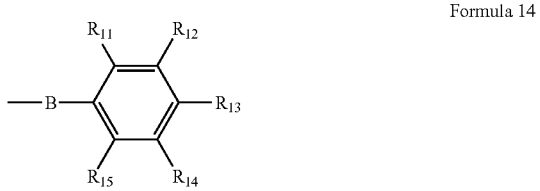

Formula 14

In Formula 14, B may be a single bond, —COO— or —OCO—, and $R_{11}$ to $R_{15}$ may be each independently hydrogen, a halogen, an alkyl group, an alkoxy group, an alkoxycarbonyl group, a cyano group, a nitro group or —O-Q-P, or a pair of two adjacent substituents among $R_{11}$ to $R_{15}$ is joined together to form a benzene ring substituted with —O-Q-P, with the proviso that at least one of substituents $R_{11}$ to $R_{15}$ is —O-Q-P, or at least one pair of two adjacent substituents among $R_{11}$ to $R_{15}$ is joined together to form a benzene ring substituted with —O-Q-P, where Q may be an alkylene group or an alkylidene group, and P may be a polymerizable functional group such as an alkenyl group, an epoxy group, a cyano group, a carboxyl group, an acryloyl group, a methacryloyl group, an acryloyloxy group or a methacryloyloxy group.

In Formulas 13 and 14, the term "two adjacent substituents being joined together to form a benzene ring substituted with —O-Q-P" may refer to the two adjacent substituents being joined together so as to form a naphthalene backbone substituted with —O-Q-P as a whole.

In Formula 14, the mark "–" indicated on the left side of the "B" may refer to the "B" being directly bound to the benzene ring of Formula 13.

In Formulas 13 and 14, the term "single bond" may mean that no atom is present in a site represented by the "A" or "B." For example, if the "A" in Formula 13 is a single bond, the benzene rings disposed on both sides of A may be directly bound to form a biphenyl structure.

In Formulas 13 and 14, the halogen may be, for example, chlorine, bromine or iodine.

In Formulas 13 and 14, the term "alkyl group" may refer to a linear or branched alkyl group having 1 to 20 carbon atoms, 1 to 16 carbon atoms, 1 to 12 carbon atoms, 1 to 8 carbon atoms or 1 to 4 carbon atoms; or a cycloalkyl group having 3 to 20 carbon atoms, 3 to 16 carbon atoms or 4 to 12 carbon atoms. The alkyl group may be optionally substituted with one or more substituents.

Unless defined otherwise, the term "alkoxy group" as used herein may refer to an alkoxy group having 1 to 20 carbon atoms, 1 to 16 carbon atoms, 1 to 12 carbon atoms, 1 to 8 carbon atoms or 1 to 4 carbon atoms. The alkoxy group may be linear, branched or cyclic structure. Also, the alkoxy group may be optionally substituted with one or more substituents.

Unless defined otherwise, the term "alkylene group or alkylidene group" may refer to an alkylene group or alkylidene group having 1 to 12 carbon atoms, 4 to 10 carbon atoms or 6 to 9 carbon atoms. The alkylene group or alkylidene group may be, for example, linear, branched or cyclic structure. Also, the alkylene group or alkylidene group may be optionally substituted or unsubstituted with one or more substituents.

Unless defined otherwise, the term "alkenyl group" may refer to an alkenyl group having 2 to 20 carbon atoms, 2 to 16 carbon atoms, 2 to 12 carbon atoms, 2 to 8 carbon atoms or 2 to 4 carbon atoms. The alkenyl group may be linear, branched or cyclic structure. Also, the alkenyl group may be optionally substituted with one or more substituents.

In one embodiment, in Formulas 13 and 14, the "P" may be, for example, an acryloyl group, a methacryloyl group, an acryloyloxy group or a methacryloyloxy group; or may be, for example, an acryloyloxy group or a methacryloyloxy group; or may be, for example, an acryloyloxy group.

The liquid crystal layer may include the monofunctional polymerizable liquid crystal compound in an amount of greater than 0 parts by weight and not more than 100 parts by weight, 1 to 90 parts by weight, 1 to 80 parts by weight, 1 to 70 parts by weight, 1 to 60 parts by weight, 1 to 50 parts by weight, 1 to 30 parts by weight or 1 to 20 parts by weight, relative to 100 parts by weight of the multifunctional polymerizable liquid crystal compound.

The effect obtained by mixing the multifunctional and monofunctional polymerizable liquid crystal compounds may be maximized within the above weight ratios. Also, the liquid crystal layer may exhibit an excellent adhesive property to the adhesive layer.

The multifunctional and monofunctional polymerizable liquid crystal compounds may be included in the liquid crystal layer under the state where they are horizontally aligned.

The term "being horizontally aligned" as used herein may mean that the optical axis of the liquid crystal layer including a polymerized liquid crystal compound has an inclination angle of approximately 0° to approximately 25°, approximately 0° to approximately 15°, approximately 0° to approximately 10°, approximately 0° to approximately 5°, or approximately 0° with respect to the plane of the liquid crystal layer. The term "optical axis" as used herein may refer to a fast axis or slow axis when incident light pass through a corresponding region.

In one embodiment, the optical device may be a device capable of dividing incident light into two or more kinds of light having different polarized states to each other. Such a device may be, for example, used to obtain a stereoscopic image.

For this purpose, the liquid crystal layer may include, for example, a first region and a second region. The first and second regions may have different phase retardation properties to each other. The term "first and second regions having different phase retardation properties to each other" as used herein may include a case where the first and second regions have optical axes formed in the same or different directions and also have different phase retardation values under the state where both of the first and second regions have the phase retardation properties; or a case where the first and second regions have optical axes formed in different directions and have the same phase retardation value, on the condition that both of the first and second regions have the phase retardation properties. In another embodiment, the term "first and second regions having different phase retardation properties to each other" as used herein may also include a case where one of the first and second regions has a phase retardation property, and the other region is an optically isotropic region having no phase retardation property. Examples of the above case may include a case where the liquid crystal layer includes a region in which the liquid crystal materials are formed along with a region in which the liquid crystal materials are not formed. The phase retardation property of the first or second region may be regulated, for example, by controlling an alignment state of the liquid crystal compound, the above refractive index relationship of the liquid crystal layer or the thickness of the liquid crystal layer.

In one embodiment, as shown in FIG. 2, the first region "A" and the second region "B" may have stripe shape extending in the same direction and may be adjacent to each other and alternately arranged. In other embodiment, as shown in FIG. 3, the first region "A" and the second region "B" may be formed in a lattice pattern and alternately arranged adjacent to each other.

In case where the optical device is used to display stereoscopic image, one of the first and second regions may be a polarization modulation region for an image signal for the left eye (hereinafter, referred to as "LC region"), and the other region may be a polarization modulation region for an image signal for the right eye (hereinafter, referred to as "RC region").

In one embodiment, the two or more kinds of light having the different polarized states, which are divided by the liquid crystal layer including the first and second regions, may include two kinds of linearly polarized lights of which polarized directions are substantially vertical to each other, or include left-circularly polarized light and right-circularly polarized light.

Unless defined otherwise, the term "vertical," "horizontal," "perpendicular" or "parallel" are used when defining the angle, it means that the angle is substantially "vertical," "horizontal," "perpendicular" or "parallel." For example, the terms may include errors induced from manufacturing errors or variations. Therefore, the terms may, for example, include errors within approximately ±15 degrees, errors within approximately ±10 degrees or errors within approximately ±5 degrees.

In one embodiment, one of the first and second regions may be a region configured not to rotate the polarization axis of the light passing through it, and the other region may be a region configured to rotate the polarization axis of the light passing through it so as for the rotated axis to be perpendicular to the polarization axis of the light which has passed through the region configured not to rotate the polarization axis. In this case, the regions including the polymerizable liquid crystal compound in the liquid crystal layer may be formed only on one of the first and second regions. In the above, the regions which do not include the polymerizable liquid crystal compound may be empty space, or may be a region in which a glass or optically isotropic resin layer, resin film or resin sheet is formed.

In another embodiment, one of the first and second regions may be a region configured to convert the light passing through it into left-circularly polarized light, and the other region may be a region configured to convert the light passing through it into right-circularly polarized light. In this case, the first and second regions may have optical axes formed in different directions and also have the same phase retardation value, or one of the first and second regions may be a region by which incident light may be phase-retarded by ¼ of its wavelength, and the other region may be a region by which incident light may be phase-retarded by ¾ of its wavelength.

In one embodiment, the first and second regions may have the same phase retardation value, for example, a value capable of phase-retarding incident light by ¼ of its wavelength, and also have optical axes formed in different directions to each other. In the above, the optical axes formed in the different directions may be, for example, form a right angle.

If the first and second regions have the optical axes formed in different directions, a line bisecting an angle formed by the optical axes of the first and the second regions may be, for example, formed to be vertical or horizontal with respect to the absorption axis of the polarizer.

FIG. 4 shows a schematic for illustrating the optical axes arrangement of the first and second regions in case where the first and second regions "A" and "B" in FIG. 2 or 3 have optical axes formed in different directions to each other. Referring to FIG. 4, a line bisecting an angle formed by the optical axes of the first and second regions "A" and "B" may refer to a line bisecting an angle of ($\Theta_1+\Theta_2$). For example, if $\Theta_1$ and $\Theta_2$ are the same angle, the line bisecting an angle formed by the optical axes may be formed to be horizontal with respect to a boundary line "L" between the first and second regions "A" and "B." In the above, an angle, i.e., ($\Theta_1+\Theta_2$), formed by the optical axes of the first and second regions "A" and "B" may also be, for example, 90°.

In one embodiment, the optical device may satisfy the conditions of the following Equation 1.

$$X<8\% \qquad \text{Equation 1}$$

In Equation 1, X represents a percentage of a variation in a phase difference value of the liquid crystal layer obtained after keeping the optical device at 80° C. for 100 hours or 250 hours, relative to the initial phase difference value of the liquid crystal layer of the optical device.

The "X" may be, for example, 7% or less, 6% or less or 5% or less. The variation in the phase difference value may be measured using a method described in the following Examples.

The optical device may further include a substrate layer. The substrate layer may be formed on the side opposite to the side on which the adhesive layer is formed, of the liquid crystal layer. The substrate layer may be a layer on which the liquid crystal layer is formed. The substrate layer may have a single-layer or multilayer structure. FIG. 5 shows a schematic of an illustrative embodiment of the optical device 5 which further includes the substrate layer 51.

As the substrate layer, for example, a glass substrate layer or a plastic substrate layer may be used. Examples of the plastic substrate layer may include a sheet or film which includes a cellulose resin such as triacetyl cellulose (TAC) or diacetyl cellulose (DAC); a cyclo olefin polymer (COP) such as a norbornene derivative; an acryl resin such as poly(methyl methacrylate) (PMMA); polycarbonate (PC); a polyolefin such as polyethylene (PE) or polypropylene (PP); a polyvinyl alcohol (PVA); poly ether sulfone (PES); polyetheretherketone (PEEK); polyetherimide (PEI); polyethylene naphthalate (PEN); a polyester such as polyethylene terephthalate (PET); polyimide (PI); polysulfone (PSF); or a fluoro resin.

In one embodiment, the substrate layer such as the plastic substrate layer may have a refractive index lower than the liquid crystal layer. Examples of the refractive index of the substrate layer may be in a range from approximately 1.33 to approximately 1.53. If the substrate layer has a refractive index lower than that of the liquid crystal layer, it may be possible to enhance brightness, prevent reflection from being generated and improve contrast ratio.

The plastic substrate layer may be optically isotropic or anisotropic. If the substrate layer is optically anisotropic, the substrate layer may be arranged so as for its optical axis to be vertical or horizontal to the line bisecting an angle formed by the optical axes of the first region and the second region, as described above.

In one embodiment, the substrate layer may further include a UV blocking agent or a UV ray absorbent. If the substrate layer includes the UV blocking agent or absorbent, it is possible to prevent degradation of the liquid crystal layer caused by UV rays. Examples of the UV blocking agent or absorbent may include an organic material such as a salicylic acid ester compound, a benzophenone compound, an oxybenzophenone compound, a benzotriazol compound, a cyanoacrylate compound or a benzoate compound, or an inorganic material such as zinc oxide or a nickel complex salt. The amount of the UV blocking agent or absorbent in the substrate layer is not particularly limited, and may be appropriately selected in consideration of desired effects. For example, in the manufacture of the plastic substrate layer, the UV blocking agent or absorbent may be included in a weight ratio of approximately 0.1% to 25% by weight, relative to the weight of main raw materials of the substrate layer.

A thickness of the substrate layer is not particularly limited, and may be properly regulated according to a predetermined purpose of use.

In one embodiment, the optical device may further include an alignment layer disposed between the substrate layer and the liquid crystal layer. For example, referring to FIG. 5, in the optical device 1, the alignment layer may be included between the substrate layer 51 and the liquid crystal layer 13. The alignment layer may align a liquid crystal compound during formation of the optical device. As the alignment layer, a conventional alignment layer known in the art, for example, a photo alignment layer or a rubbing alignment layer, may be used. The alignment layer may be an optionally included in the optical device. Alternatively, instead of adding the alignment layer to the optical device, the substrate layer 51 itself may have an aligning property by directly rubbing or elongating it without.

In one embodiment, the optical device may further include a protective layer. The protective layer may be included in the side opposite to the side on which the adhesive layer is formed of the polarizer. FIG. 6 shows a schematic of an illustrative embodiment of the optical device 6 which further includes the protective layer 61 attached on the upper side of the polarizer 12. For example, the protective layer 61 may be a cellulose resin film such as a triacetyl cellulose (TAC) film; a polyester film such as a polyethylene terephthalate (PET) film; a polycarbonate (PC) film; a polyethersulfone (PES) film; an acryl film; a polyolefin film such as a polyethylene (PE), polypropylene (PP) or cyclic olefin resin film; or a resin layer that is cured to form a hard layer, but it is not limited thereto.

In one embodiment, the optical device may further include a phase retardation layer. The phase retardation layer may be included in the side opposite to the side on which the adhesive layer is formed of the polarizer. The phase retardation layer may be a ¼-wavelength phase retardation layer or a ½-wavelength phase retardation layer. The term "¼- or ½-wavelength phase retardation layer" as used herein may refer to a phase retardation device capable of phase-retarding incident light by ¼ or ½ of its wavelength. For example, the optical device of the above structure may be effectively used as a device applied to an organic light emitting diode (OLED) to give a light division function and an anti-reflection function. As the phase retardation layer, for example, a polymer film to which a birefringence property is imparted by, for example, an elongation process or a liquid crystal layer formed by polymerizing a polymerizable liquid crystal compound may be used.

In one embodiment, the optical device may further include a pressure-sensitive adhesive layer. The pressure-sensitive adhesive layer may be formed on the side opposite to the side on which the adhesive layer is formed of the polarizer. For example, the pressure-sensitive adhesive layer may be used to attach the optical device to an optical instrument such as a liquid crystal panel of a liquid crystal display device or an image display element of a stereoscopic image display device. FIG. 7 shows a schematic of an illustrative embodiment of the optical device 7 in which a pressure-sensitive adhesive layer 71 is formed on the upper side of the polarizer 12.

The pressure-sensitive adhesive layer may have a storage modulus at 25° C. of 0.02 MPa or more, 0.03 MPa or more, 0.04 MPa or more, 0.05 MPa or more, 0.06 MPa or more, 0.07 MPa or more, 0.08 MPa or more, greater than 0.08 MPa, or 0.09 MPa or more. The upper limit of the storage modulus is not particularly limited. For example, the storage modulus may be 0.25 MPa or less, 0.2 MPa or less, 0.16 MPa or less, 0.1 MPa or less, or 0.08 MPa or less.

If the pressure-sensitive adhesive layer has the storage modulus within the above range, the optical device may show excellent durability, and therefore, for example, show a stable light division property since the phase retardation property of the liquid crystal layer is stably maintained for a long period of time even under the severe conditions. Also, it is possible to prevent side effects such as light leakage in optical instruments using the optical device. In addition, the optical device may show excellent resistance to an external pressure or scratch due to its improved hardness property, and also show excellent reworkability.

The pressure-sensitive adhesive layer may have a thickness of 25 µm or less, 20 µm or less, or 18 µm or less. If the pressure-sensitive adhesive layer has the thickness within the above range, the durability, hardness property and reworkability may be further improved. If the pressure-sensitive adhesive layer becomes thinner, the pressure-sensitive adhesive may show more excellent physical properties, and therefore the lower limit of the thickness is not particularly limited. For example, the thickness of the pressure-sensitive adhesive layers may be, for example, adjusted within a range of approximately 1 μm or more, or approximately 5 μm or more in consideration of processability.

The pressure-sensitive adhesive layer may include an acrylic pressure-sensitive adhesive, a silicon pressure-sensitive adhesive, an epoxy pressure-sensitive adhesive or a rubber pressure-sensitive adhesive.

If the pressure-sensitive adhesive layer includes the acrylic pressure-sensitive adhesive, the pressure-sensitive adhesive may be, for example, formed by curing a pressure-sensitive adhesive composition that includes a thermocurable component, an active energy ray-curable component, or both of the thermocurable component and the active energy ray-curable component.

In the above, the term "thermocurable component" or "active energy ray-curable component" may refer to a component whose curing is induced by application of suitable heat or irradiation of active energy rays, respectively.

The pressure-sensitive adhesive layer formed from the composition including the thermocurable component may include an acrylic polymer that is cross-linked by a multifunctional cross-linking agent.

In one embodiment, an acrylic polymer having a weight average molecular weight of 500,000 or more may be used as the acrylic polymer cross-linked by the multifunctional cross-linking agent. The term "weight average molecular weight" as used herein may refer to a converted value with respect to a standard polystyrene, which may be measured by Gel Permeation Chromatograph (GPC). Unless defined otherwise, the term "molecular weight" may mean the "weight average molecular weight." If the polymer has a molecular weight of 500,000 or more, it is possible to form a pressure-sensitive adhesive layer having excellent durability even under severe conditions. The upper limit of the molecular weight is not particularly limited, but the molecular weight of the acrylic polymer may be, for example, adjusted within 2,500,000 or less in consideration of the durability or a coating property of a composition.

In one embodiment, the acrylic polymer may be a polymer include a (meth)acrylic ester monomer and a cross-linkable monomer as polymerized units.

As the (meth)acrylic ester monomer, for example, alkyl (meth)acrylate may be used. For instance, alkyl (meth)acrylate that includes an alkyl group having 1 to 20 carbon atoms may be used in consideration of the cohesion, glass transition temperature or pressure-sensitive adhesive property of the pressure-sensitive adhesive. Examples of such a monomer may include methyl (meth)acrylate, ethyl (meth)acrylate, n-propyl (meth)acrylate, isopropyl (meth)acrylate, n-butyl (meth)acrylate, t-butyl (meth)acrylate, sec-butyl (meth)acrylate, pentyl (meth)acrylate, 2-ethylhexyl (meth)acrylate, 2-ethylbutyl (meth)acrylate, n-octyl (meth)acrylate, isooctyl (meth)acrylate, isononyl (meth)acrylate, lauryl (meth)acrylate and tetradecyl (meth)acrylate, which may be used alone or in combination with the other.

The polymer may further include the cross-linkable monomer as a polymerized unit. For example, the polymer may include 80 to 99.9 parts by weight of the polymerized (meth) acrylic ester monomer and 0.1 to 20 parts by weight of the polymerized cross-linkable monomer. The term "cross-linkable monomer" as used herein may refer to a monomer that can be copolymerized with another monomer used to form the acrylic polymer and provide a cross-linkable functional group to the polymer after the copolymerization. The cross-linkable functional group may react with the multifunctional cross-linking agent as will be described later to form a cross-linked structure.

Examples of the cross-linkable functional group may include a hydroxyl group, a carboxyl group, an epoxy group, an isocyanate group or a nitrogen-containing functional group such as an amino group. Copolymerizable monomers which can provide the cross-linkable functional group during the manufacture of the pressure-sensitive adhesive resin are widely known in the art.

Examples of the cross-linkable monomer may include, but are not limited to, a hydroxyl group-containing monomer such as 2-hydroxyethyl (meth)acrylate, 2-hydroxypropyl (meth)acrylate, 4-hydroxybutyl (meth)acrylate, 6-hydroxyhexyl (meth)acrylate, 8-hydroxyoctyl (meth)acrylate, 2-hydroxyethyleneglycol (meth)acrylate or 2-hydroxypropyleneglycol (meth)acrylate; a carboxyl group-containing monomer such as (meth)acrylic acid, 2-(meth)acryloyloxy acetic acid, 3-(meth)acryloyloxy propyl acid, 4-(meth)acryloyloxy butyric acid, an acrylic acid dimer, itaconic acid, maleic acid and maleic anhydride, or a nitrogen-containing monomer such as (meth)acrylamide, N-vinyl pyrrolidinone or N-vinyl caprolactam, which may be used alone or in combination.

The acrylic polymer may include various other monomers as a polymerized unit, if necessary. Examples of the other monomers may include a nitrogen-containing monomer such as (meth)acrylonitrile, (meth)acrylamide, N-methyl (meth) acrylamide or N-butoxy methyl (meth)acrylamide; a styrene-based monomer such as styrene or methyl styrene; glycidyl (meth)acrylate; or a carboxylic acid vinyl ester such as vinyl acetate. Such additional monomers may be used in an amount of 20 parts by weight or less, relative to the total weight ratio of the other monomers.

The acrylic polymer may be prepared by subjecting a monomer mixture obtained by appropriately selecting and mixing the components as described above to a polymerization such as solution polymerization, photopolymerization, bulk polymerization, suspension polymerization or emulsion polymerization.

Examples of the multifunctional cross-linking agent which may cross-link the acrylic polymer in the pressure-sensitive adhesive layer may include conventional thermocurable cross-linking agents such as an isocyanate cross-linking agent, an epoxy cross-linking agent, an aziridine cross-linking agent and a metal chelate cross-linking agent. In the above, examples of the isocyanate cross-linking agent may include a multifunctional isocyanate compound such as tolylene diisocyanate, xylene diisocyanate, diphenylmethane diisocyanate, hexamethylene diisocyanate, isophorone diisocyanate, tetramethylxylene diisocyanate or naphthalene diisocyanate, or a compound obtained by reacting the multifunctional isocyanate compound with a polyol compound such as trimethylol propane. Examples of the epoxy cross-linking agent may include at least one selected from the group consisting of ethyleneglycol diglycidyl ether, triglycidyl ether, trimethylolpropane triglycidyl ether, N,N,N',N'-tetraglycidyl ethylenediamine and glycerin diglycidyl ether, examples of the aziridine cross-linking agent may include at least one selected from the group consisting of N,N'-toluene-2,4-bis(1-aziridine-carboxamide), N,N'-diphenylmethane-4, 4'-bis(1-aziridine-carboxamide), triethylene melamine, bisisoprotaloyl-1-(2-methylaziridine) and tri-1-aziridinylphosphine oxide, and examples of the metal chelate cross-linking agent may include compounds obtained by coordinating a polyvalent metal such as aluminum, iron, zinc, tin, titanium, antimony, magnesium or vanadium with acetylacetone or ethyl acetoacetate, but it is not limited thereto.

The composition that includes the thermocurable component or the pressure-sensitive adhesive layer formed therefrom may include, for example, the multifunctional cross-linking agent in an amount of 0.01 to 10 parts by weight or 0.01 to 5 parts by weight, relative to 100 parts by weight of the acrylic polymer. If the weight ratio of the cross-linking agent is controlled to be 0.01 parts by weight or more, it is possible to effectively maintain cohesion of a pressure-sensitive adhesive, and if the weight ratio of the cross-linking agent is controlled to be 10 parts by weight or less, it is possible to prevent interlayer detachment or delamination from being caused in the adhesive interface and maintain excellent durability. However, the weight ratio may be varied according to desired properties such as elastic modulus or the presence of other cross-linked structures in the pressure-sensitive adhesive layer.

The pressure-sensitive adhesive layer formed of the composition including the active energy ray-curable component may include a cross-linked structure including a polymerized active energy ray-polymerizable compound. The pressure-sensitive adhesive layer may be, for example, formed by mixing a compound including at least one functional group capable of being polymerized by being irradiated with active energy rays, such as, for example, an alkenyl group, an acryloyl group, a methacryloyl group, an acryloyloxy group or a methacryloyloxy group so as to prepare the pressure-sensitive adhesive composition, and cross-linking and/or polymerizing the components by irradiating the composition with active energy rays. In the above, examples of the compound including the functional group capable of being polymerized by being irradiated with the active energy rays may include a polymer obtained by introducing a functional group such as an acryloyl group, a methacryloyl group, an acryloyloxy group or a methacryloyloxy group into a side chain of the acrylic polymer; a compound known as an active energy ray-curable oligomer in the art, such as urethane acrylate, epoxy acrylate, polyester acrylate or polyether acrylate; or a multifunctional acrylate as will be described later.

In one embodiment, the pressure-sensitive adhesive layer formed from the composition including both of the thermocurable component and the active energy ray-curable component may include both of the cross-linked structure including the acrylic polymer cross-linked by the multifunctional cross-linking agent and the cross-linked structure including the polymerized active energy ray-polymerizable compound.

The above pressure-sensitive adhesive layer may be referred to as a pressure-sensitive adhesive that includes a so-called interpenetrating polymer network (hereinafter referred to as "IPN"). The term "IPN" may refer to a state where at least two kinds of cross-linked structures are included in the pressure-sensitive adhesive layer. In one embodiment, the at least two kinds of cross-linked structures may be included under the state where they are entangled, linked or penetrated to each other. If the pressure-sensitive adhesive layer includes the IPN, it may show excellent durability even under the severe conditions, and also may realize an optical device having excellent workability or an excellent ability to prevent light leakage or crosstalk.

As the multifunctional cross-linking agent and the acrylic polymer included in the cross-linked structure of the IPN structure, the components as described in the thermocurable composition may be used.

Also, as the active energy ray-polymerizable compound included in the cross-linked structure of the IPN structure, the components as described in the composition including the active energy ray-polymerizable compound may be used.

In one embodiment, the active energy ray-polymerizable compound may be a multifunctional acrylate. Any compounds including at least two (meth)acryloyl groups may be used as the multifunctional acrylate. For example, the multifunctional acrylate usable herein may include a difunctional acrylate such as 1,4-butanediol di(meth)acrylate, 1,6-hexanediol di(meth)acrylate, neopentylglycol di(meth)acrylate, polyethylene glycol di(meth)acrylate, neopentylglycol adipate di(meth)acrylate, hydroxyl puivalic acid neopentylglycol di(meth)acrylate, dicyclopentanyl di(meth)acrylate, caprolactone-modified dicyclopentenyl di(meth)acrylate, ethyleneoxide-modified di(meth)acrylate, di(meth)acryloxy ethyl isocyanurate, allylated cyclohexyl di(meth)acrylate, tricyclodecanedimethanol(meth)acrylate, dimethylol dicyclopentane di(meth)acrylate, ethyleneoxide-modified hexahydrophthalic di(meth)acrylate, tricyclodecane dimethanol (meth)acrylate, neopentylglycol-modified trimethylpropane di(meth)acrylate, adamantane di(meth)acrylate or 9,9-bis[4-(2-acryloyloxyethoxy)phenyl]fluorene; a trifunctional acrylate such as trimethylolpropane tri(meth)acrylate, dipentaerythritol tri(meth)acrylate, propionic acid-modified dipentaerythritol tri(meth)acrylate, pentaerythritol tri(meth) acrylate, propyleneoxide-modified trimethylolpropane tri (meth)acrylate, trifunctional urethane (meth)acrylate or tris (meth)acryloxyethylisocyanurate; a tetrafunctional acrylate such as diglycerin tetra(meth)acrylate or pentaerythritol tetra (meth)acrylate; a pentafunctional acrylate such as propionic acid-modified dipentaerythritol penta(meth)acrylate; and a hexafunctional acrylate such as dipentaerythritol hexa(meth) acrylate, caprolactone-modified dipentaerythritol hexa (meth)acrylate or urethane (meth)acrylate (for example, a hexafunctional acrylate such as a reaction product of an isocyanate monomer and trimethylolpropane tri(meth)acrylate, etc.).

In one embodiment, a multifunctional acrylate including a ring structure in its molecule may be used. The ring structure included in the multifunctional acrylate may be a carbocyclic structure or a heterocyclic structure. Also, the ring structure may be a monocyclic structure or a polycyclic structure. Examples of the multifunctional acrylate having a ring structure may include a monomer having an isocyanurate structure, such as tris(meth)acryloxy ethyl isocyanurate, and a hexafunctional acrylate such as isocyanate-modified urethane (meth)acrylate (for example, a reaction product of an isocyanate monomer and trimethylolpropane tri(meth)acrylate, etc.), but it is not limited thereto.

The active energy ray-polymerizable compound forming the cross-linked structure in the pressure-sensitive adhesive layer includes the IPN, and the active energy ray-polymerizable compound may be, for example, included in an amount of 5 to 40 parts by weight, relative to 100 parts by weight of the acrylic polymer, but the amount may be varied if necessary.

Along with the above components, the pressure-sensitive adhesive layer may further include other various additives known in the art.

For example, the composition including the active energy ray-curable component may further include a photoinitiator to facilitate a polymerization reaction of the components. Also, the pressure-sensitive adhesive layer may further include at least one additive selected from the group consisting of a silane coupling agent, a tackifier, an epoxy resin, a curing agent, a UV stabilizer, an antioxidant, a toning agent, a reinforcing agent, a filler, an antifoaming agent, a surfactant and a plasticizer.

The pressure-sensitive adhesive layer may be formed, for example, by coating a pressure-sensitive adhesive composition prepared by mixing the above-described components by a tool such as a bar coater or a comma coater, and then curing it. Also, a method of the curing is not particularly limited. For example, the pressure-sensitive adhesive composition may be cured by maintaining it at an appropriate temperature to induce a cross-linking reaction of the acrylic polymer and the multifunctional cross-linking agent, and/or by irradiating a composition with active energy rays so as to polymerize the active energy ray-curable compound. If both of the curing methods, i.e., maintaining the composition at an appropriate temperature and irradiating the composition with active energy rays, are required to be performed, they may be performed sequentially or simultaneously. In the above, the irradiation with the active energy rays may be, for example, performed using a high-pressure mercury lamp, an electrodeless lamp or a xenon lamp, and the conditions such as a wavelength or light intensity of the irradiated active energy rays may be selected to properly perform polymerization of the active energy ray-curable compound.

In one embodiment, the pressure-sensitive adhesive layer may have a storage modulus at 25° C. of 0.02 MPa or greater, 0.05 MPa or greater, greater than 0.08 MPa, greater than 0.08 MPa and also not greater than 0.25 MPa, 0.09 MPa to 0.2 MPa, or 0.09 MPa to 0.16 MPa. The pressure-sensitive adhesive layer having the modulus within the above ranges may be the pressure-sensitive adhesive layer including the IPN structure.

In another embodiment, the pressure-sensitive adhesive layer may have a storage modulus at 25° C. of 0.02 MPa to 0.08 MPa or 0.04 MPa to 0.08 MPa. The pressure-sensitive adhesive layer having the modulus within the above ranges may be the pressure-sensitive adhesive layer including the cross-linked structure of the thermocurable component.

This application is also directed to a method of manufacturing an optical device. In one embodiment, the method may include attaching the polarizer and the liquid crystal layer by the adhesive.

In the above, for example, the liquid crystal layer may be formed by forming an alignment layer on the substrate layer, coating a liquid crystal composition including the polymerizable liquid crystal compounds on the alignment layer and then polymerizing the liquid crystal composition under the state where the liquid crystal compounds are aligned in a predetermined direction.

The alignment layer may be, for example, formed by forming a polymer film such as polyimide on the substrate layer, and then rubbing it, by coating a photo alignable compound, and then aligning it by irradiation with, for example, linearly polarized light, or by an imprinting method such as a nanoimprinting. Various methods of forming the alignment layer are known in the art according to desired alignment patterns, for example, patterns of the first and second regions.

The coating layer of the liquid crystal composition may be, for example, formed by coating the composition on the alignment layer on the substrate layer using a known method. The liquid crystal layer may be formed by aligning the liquid crystal composition according to an alignment pattern of the alignment layer under the coating layer and then polymerizing the liquid crystal composition.

A method of attaching the liquid crystal layer and the polarizer is not particularly limited. For example, they may be attached to each other by coating the adhesive composition on the liquid crystal layer or on the polarizer, laminating the liquid crystal layer and the polarizer by the coated adhesive composition and then curing the adhesive composition, or by attaching the liquid crystal layer and the polarizer by the dropping method using the adhesive composition and then curing the adhesive composition. In the above, the curing of the adhesive composition may be, for example, performed by irradiating it with active energy rays having an appropriate intensity in consideration of components in the adhesive composition.

In one embodiment, the preparation method may further include forming an additional layer such as the protective layer or the phase retardation layer, along with the above processes. The formation method of the additional layer is not particularly limited.

This application is also directed to a stereoscopic image display device. In one embodiment, the stereoscopic image display device may include the above-described optical device.

In one embodiment, the display device may further include a display element capable of generating an image signal for the left eye (hereinafter referred to as an "L signal") and an image signal for the right eye (hereinafter referred to as an "R signal"). The optical device may be arranged so that the L and R signals generated from the display element can pass through the polarizer and then pass through the liquid crystal layer. In another embodiment, the first and second regions having different phase retardation properties to each other may be formed on the liquid crystal layer, and the optical device may be arranged so that the L signal can pass through one region of the first and second regions and the R signal can pass through the other region. In the above, the optical device may be arranged so that the R and L signals can pass through the polarizer of the optical device and then pass through each region of the liquid crystal layer when the R and L signals are emitted from the display element.

As long as the stereoscopic image display device includes the optical device as a light-dividing device, a variety of methods known in the art may be applied to manufacture of the stereoscopic image display device.

FIG. 8 shows a schematic of an illustrative embodiment of the display device which generates the stereoscopic image emitted from which can be observed with wearing the polarized glasses.

For example, the device 8 may sequentially include a light source 81, a polarizing plate 82, the display element 83 and the optical device 84, as shown in FIG. 8. By way of an example of the optical device 84, the optical device having a structure, in which the liquid crystal layer and the polarizer are attached by the adhesive, and which may further includes, if necessary, the protective layer, the phase retardation layer and/or the pressure-sensitive adhesive layer formed on the polarizer, as described referring to FIG. 1, 5, 6 or 7, may be used.

In the above, a direct or edge backlight that is generally used for liquid crystal display devices (LCDs) may be, for example, used as the light source 81.

The display element 83 may form the L and R signals as described above. In one embodiment, the display element 83 may be a transmissive liquid crystal display panel including a plurality of unit pixels which are arranged in a row and/or column direction. One or two or more pixels may be combined to form an image signal-generating region (hereinafter referred to as an "RG region") for the right eye for generating an R signal and an image signal-generating region (hereinafter referred to as an "LG region") for the left eye for generating an L signal.

The RG and LG regions may have stripe shapes extending in the same direction and alternately arranged adjacent to each other, as shown in FIG. 9, or they may be formed in a lattice pattern and alternately arranged adjacent to each other, as shown in FIG. 10. In the liquid crystal layer 842 of the optical device 84, the first and second regions may correspond to the LC and RC regions, respectively, and may be arranged in consideration of the arrangement of the RG and LG regions so that the R signal emitted from the RG region may enter into the RC region via the polarizer 841 and the L signal may enter into the LC region via the polarizer 841.

For example, the display element 83 may be a liquid crystal panel including a first transparent substrate, a pixel electrode, a first alignment layer, a liquid crystal layer, a second alignment layer, a common electrode, a color filter and a second transparent substrate, which are arranged sequentially from the light source 81. The polarizing plate 82 may be attached to one side of the panel into which light enters, for example, one side adjacent to the light source 81, and the optical device 84 may be attached to the other side opposite to the one side of the panel. A polarizer included in the polarizing plate 82 and a polarizer 841 included in the optical device 84 may be, for example, arranged so that the absorption axes of the two polarizers can form a predetermined angle, for example, an angle of 90°. Therefore, the arrangement of the two polarizers may allow light emitted from the light source 81 to penetrate through the display element 83 or be intercepted.

In a driving state, unpolarized light may be emitted toward the polarizing plate 82 from the light source 81 of the display device 8. Among the light incident to the polarizing plate 82, the light having a polarization axis parallel to the light transmission axis of the polarizer of the polarizing plate 82 may pass through the polarizing plate 82 and be entered into the display element 83. The light incident to the display element 83 and passing through the RG region may be converted into the R signal, and the light passing through the LG region may be converted into the L signal. The R and L signals may then be entered into the polarizer 841 of the optical device 84.

Among the light incident to the liquid crystal layer 842 via the polarizer 841, the light passing through the LC region and the light passing through the RC region are emitted, respectively, under the state where the two kinds of light have different polarized states. The R and L signals having different polarized states may enter the right and left eyes of an observer wearing the polarized glasses, respectively, and thus the observer may observe a stereoscopic image.

BRIEF DESCRIPTION OF THE DRAWINGS

FIGS. 2 and 3 show schematics of illustrative embodiments of the arrangement of first and second regions of a liquid crystal layer.

FIGS. 9 and 10 show schematics of illustrative embodiments of the arrangement of RG and LG regions.

DETAILED DESCRIPTION OF EXEMPLARY EMBODIMENTS

Figure 1:
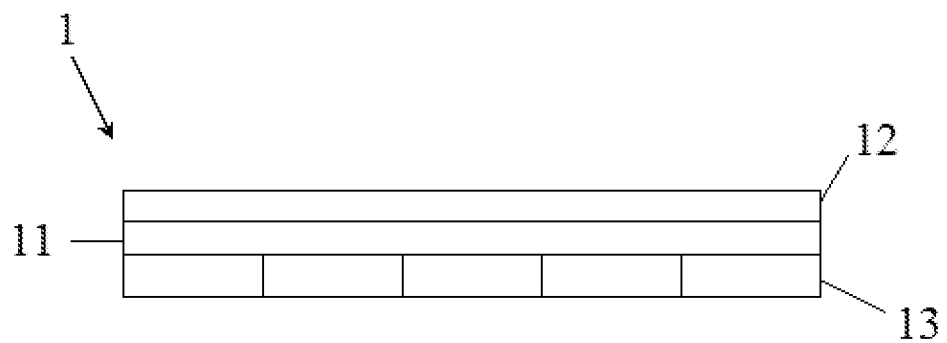
FIG. 1 shows a schematic of an illustrative embodiment of the optical device.
Figure 2:
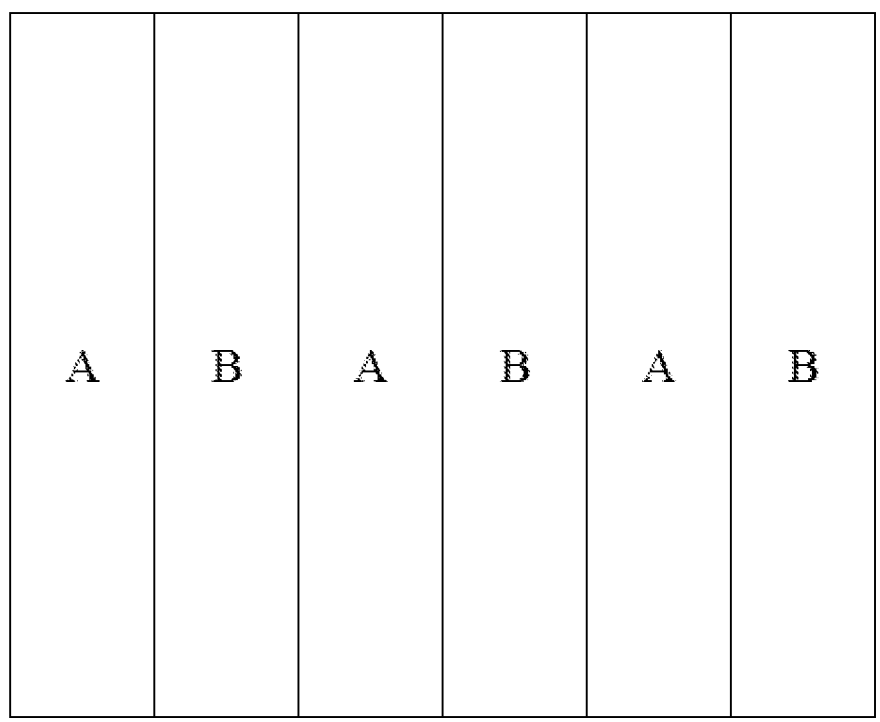
Figure 4:
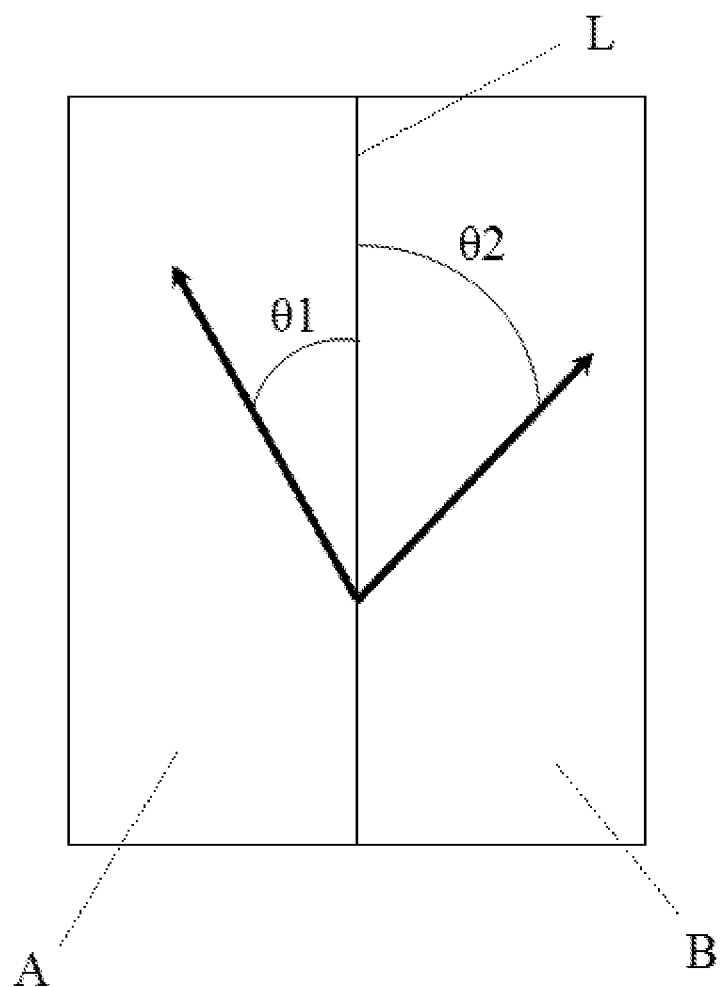
FIG. 4 shows a schematic of an illustrative embodiment of the arrangement of optical axes of the first and second regions of the liquid crystal layer.
Figure 5:
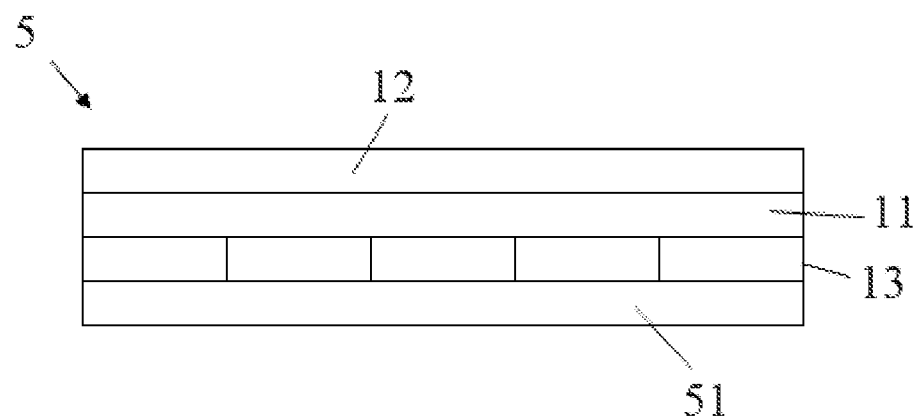
FIGS. 5 to 7 show schematics of illustrative embodiments of optical devices.
Figure 6:
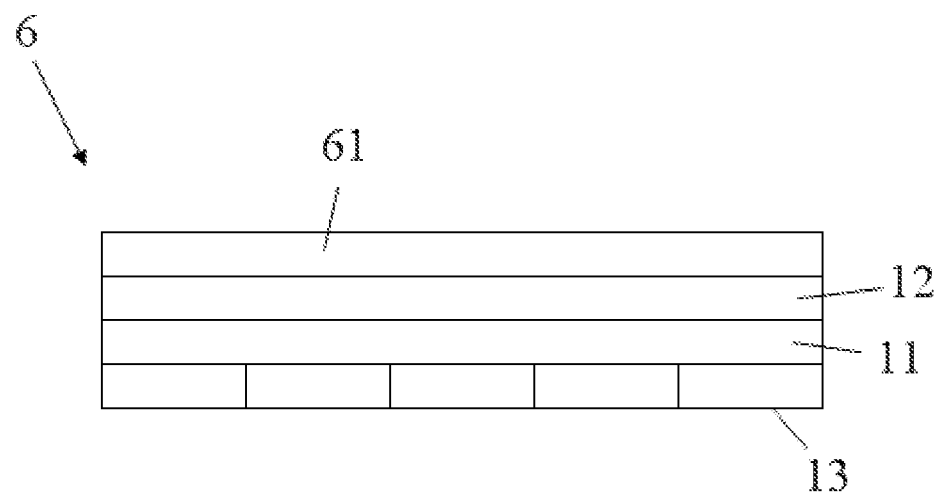
Figure 7:
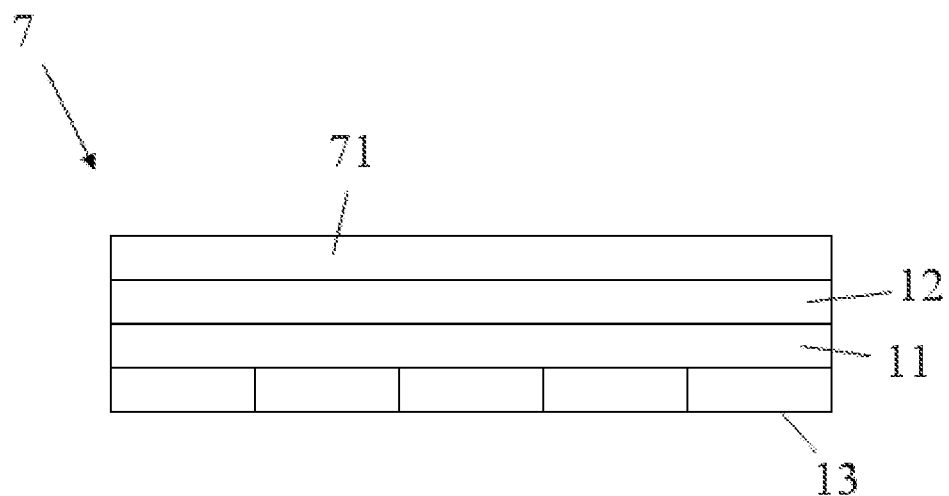
Figure 8:
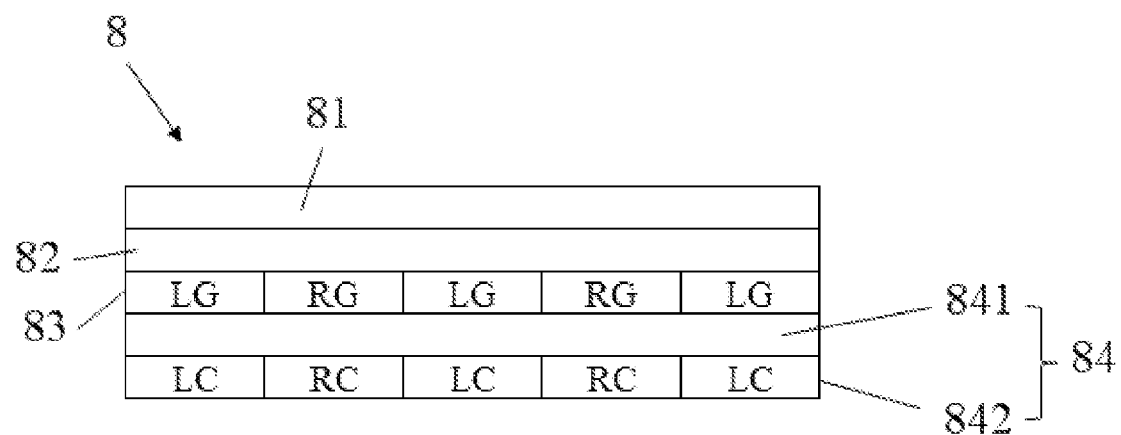
FIG. 8 shows a schematic of an illustrative embodiment of the stereoscopic image display device.

Hereinafter, embodiments of the optical device will be described in detail. However, the optical device is not limited to the embodiments disclosed below, but can be implemented in various forms.

Although the terms first, second, etc. may be used to describe various elements, these elements are not limited by these terms. These terms are only used to distinguish one element from another. For example, a first element could be termed a second element, and, similarly, a second element could be termed a first element, without departing from the scope of embodiments. The term "and/or" includes any and all combinations of one or more of the associated listed items.

The terminology used herein is for the purpose of describing particular embodiments only and is not intended to be limiting of embodiments. The singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, components and/or groups thereof, but do not preclude the presence or addition of one or more other features, integers, steps, operations, elements, components and/or groups thereof.

With reference to the appended drawings, embodiments of the optical device will be described in detail below. To aid in understanding, like numbers refer to like elements throughout the description of the figures, and the description of the same elements will be not reiterated.

The physical properties of optical devices prepared in Examples and Comparative Examples were evaluated as follows.

1. Evaluation of Adhesion Strength

The adhesion strength was evaluated by evaluating the adhesion strength of the polarizer with respect to the substrate layer by evaluating peel strength of the polarizer by peeling the polarizer at a peeling angle of 90° and a peeling rate of 300 m/min with respect to the optical device, which was prepared in Examples or Comparative Examples, and in which the substrate layer, the alignment layer, the liquid crystal layer, the adhesive layer and the polarizer were sequentially formed. The peeling test was carried out with respect to a piece prepared by cutting the prepared optical device so as for the piece to have a width of 20 mm and a length of 100 mm. The evaluation criteria were as follows.

<Evaluation Criteria>

O: The case where peel strength of greater than 1 N/cm is measured.

X: The case where peel strength of 1 N/cm or less is measured.

2. Measurement of Gel Fraction

An adhesive layer was formed by coating a prepared adhesive composition on a release-treated surface of a releasing PET sheet so as for the coating layer to have a thickness of 10 µm after being cured, laminating another release-treated surface of the releasing PET on the coating layer, and then irradiating the coating layer with UV rays using a UV irradiation device (metal halide lamp) (UV A regions, 500 mJ/cm$^2$). Thereafter, approximately 200 mg (A) of the adhesive was taken out and put into a meshed wire net, and then dipped in approximately 50 ml of dimethylformamide for 48 hours. Then, an insoluble part of the adhesive was extracted, and then dried at 110° C. for a day. The weight (B) of the dried insoluble part was weighed, and a gel fraction was determined according to the Equation 1 (Gel fraction (%)=B/A× 100) as described above.

3. Evaluation of Thermal Shock Property

Each of the optical devices prepared in Examples and Comparative Examples was cut into pieces having a size of 10 cm×10 cm (width×length), and then attached to a glass substrate by a pressure-sensitive adhesive layer. Thereafter, one cycle, in which each optical device was kept at −40° C. for 1 hour and then kept at 80° C. for 1 hour, was repeated 100 times. Thereafter, the changes in appearance of the optical device were observed with the naked eye. The case where there was no change in the appearance of the optical device was evaluated as "O," and the case where changes such as cracks were observed in the optical device was evaluated as "X."

4. Evaluation of Durability of Liquid Crystal Layer

The durability of the liquid crystal layer was evaluated by measuring a variation in a phase difference value caused after performing a durability test with respect to the optical device prepared in Examples or Comparative Examples. The optical device was cut into pieces having a size of 10 cm×10 cm (width×length), and then attached to a glass substrate by a pressure-sensitive adhesive layer. The optical device was then kept under a heat-resistant condition of 80° C. for 100 hours or 250 hours. Then, a decrease (%) in phase difference values of the liquid crystal layer before and after being kept under the heat-resistant condition was calculated. The results are listed in the following Tables 4 and 5. In the above, the phase difference value was measured with respect to light having a wavelength of 550 nm by using Axoscan (commercially available from Axomatrix) according to the manufacturer's manual.

The durability evaluation criteria are as follows.

<Evaluation Criteria>

O: The case where variations in phase difference values of all the optical devices after being kept under a heat-resistant condition for 100 hours and 250 hours are less than 8%.

X: The case where variation in phase difference value of any one of the optical devices after being kept under a heat-resistant condition for 100 hours and 250 hours is 8% or more.

5. Crosstalk Evaluation

Figure 9:
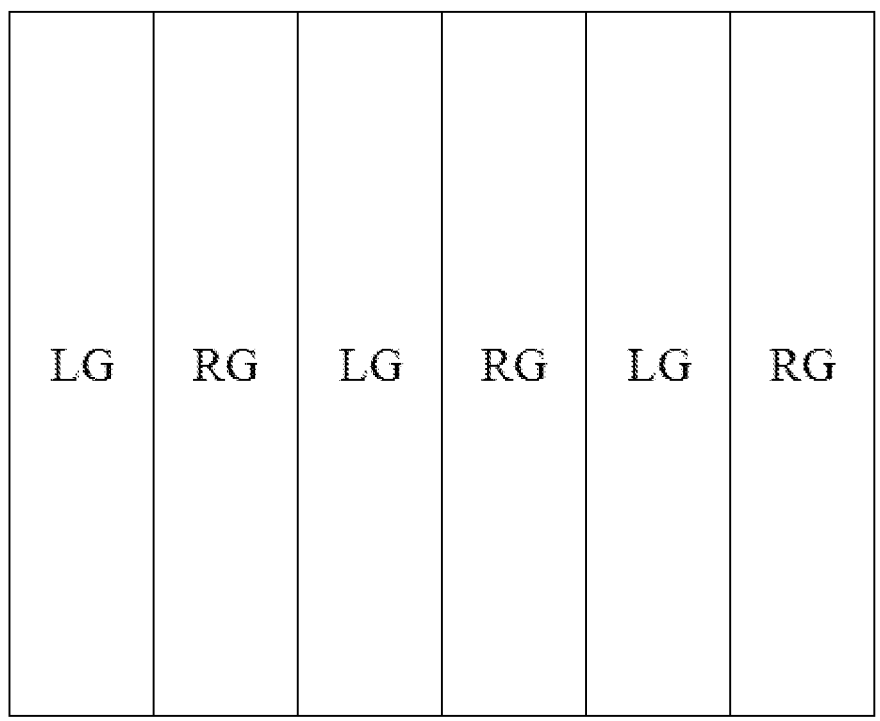

A crosstalk ratio may be defined as a ratio of brightness in a dark state to that in a bright state. In Examples and Comparative Examples, on the assumption that the optical device is applied to a polarizing glasses type stereoscopic image display device, a crosstalk ratio was measured using the following method. The optical device was used to constitute a stereoscopic image display device as shown in FIG. 9. Thereafter, the polarizing glasses for observing a stereoscopic image are placed at a conventional observatory point of a stereoscopic image display device. Here, the conventional observatory point is a point where it is 3/2 times as long as the horizontal length of the stereoscopic image display device is away from the center of the stereoscopic image display device. At this position, the polarizing glasses are placed on the assumption that the observer observes the center of the display device. The horizontal length of the stereoscopic image device may be a length in a horizontal direction based on the observer on the assumption that the observer observes a stereoscopic image. For example, the horizontal length of the image display device may be a breadthwise length of the device. In the above arrangement, under the state where the device emits the L signal, a brightness measuring meter (name: SR-UL2 Spectrometer) was arranged on back surfaces of lenses for left and right eyes of the polarizing glasses respectively, and then a brightness is measured. Here, the brightness measured on the back surface of the lens for the left eye is the brightness in a bright state, and the brightness measured on the back surface of the lens for the right eye is the brightness in a dark state. After the brightness was measured, a percentage of a ratio of the brightness in the bright state to the brightness in the dark state ([Brightness in the dark state]/[Brightness in the bright state]) may be measured, thereby defining as the crosstalk ratio. The crosstalk ratio may also be measured by the same method described above, and specifically, by measuring brightness in the bright and dark states when the display device emits the R signal. In this case, the brightness measured on the back surface of the lens for the left eye is the brightness in a dark state, and the brightness measured on the back surface of the lens for the right eye is the brightness in a bright state.

6. Evaluation of Phase Difference and Refractive Index

The phase difference value and the refractive index of the optical device or the liquid crystal layer were evaluated by using Axoscan (commercially available from Axomatrix) according to the manufacturer's manual.

7. Evaluation of Thickness and Width or Length of Optical Device

The width or length of the optical device was measured using IView Pro program and 3-dimensional equipment, Premium 600C (INTEK IMS Co., Ltd.). Also, the thickness measurement was performed using a spectral reflectometer, which was equipment capable of evaluating characteristics of a thin film using interference between light reflected on a surface of the thin film and light reflected on an interface disposed under the thin film or phase difference of light.

PREPARATIVE EXAMPLE 1

Preparation of Adhesive Composition (A)

25 parts by weight of an alicyclic epoxy compound (celloxide C2021P), 25 parts by weight of 1,4-cyclohexane dimethanol diglycidyl ether and 50 parts by weight of 3-ethyl-3-[(3-ethyloxetane-3-yl)methoxymethyl]oxetane (ARON OXETANE DOX221, commercially available from Toagosei Co., Ltd) were blended to prepare a composition. Then, 5 parts by weight of a cationic initiator (diphenyl-(4-phenylthio)phenylsulfonium hexafluorophosphate, CPI100P commercially available from Sanapro) was further blended, relative to 100 parts by weight of the total solid content of the composition, to prepare an adhesive composition (A)

PREPARATIVE EXAMPLE 2

Preparation of Adhesive Composition (B)

25 parts by weight of an alicyclic epoxy compound (celloxide C2021P), 25 parts by weight of 1,4-cyclohexane dimethanol diglycidyl ether, 35 parts by weight of 3-ethyl-3-[(3-ethyloxetane-3-yl)methoxymethyl]oxetane (ARON OXETANE DOX221 commercially available from Toagosei Co., Ltd) and 15 parts by weight of 3-ethyl-3-hydroxymethyloxetane (ARON OXETANE OXA commercially available from Toagosei Co., Ltd) were blended to prepare a composition. Then, 5 parts by weight of a cationic initiator (diphenyl-(4-phenylthio)phenylsulfonium hexafluorophosphate, CPI100P commercially available from Sanapro) was further blended, relative to 100 parts by weight of the solid content of the composition, to prepare an adhesive composition (B)

PREPARATIVE EXAMPLE 3

Preparation of Adhesive Composition (C)

25 parts by weight of an alicyclic epoxy compound (celloxide C2021P), 25 parts by weight of 1,4-cyclohexane dimethanol diglycidyl ether, 45 parts by weight of 3-ethyl-3-[(3-ethyloxetane-3-yl)methoxymethyl]oxetane (ARON OXETANE DOX221 commercially available from Toagosei Co., Ltd) and 5 parts by weight of vinyltriethoxy silane were blended to prepare a composition. Then, 5 parts by weight of a cationic initiator (diphenyl-(4-phenylthio)phenylsulfonium hexafluorophosphate, CPI100P commercially available from Sanapro) was further blended, relative to 100 parts by weight of the solid content of the composition, to prepare an adhesive composition (C)

PREPARATIVE EXAMPLE 4

Preparation of Adhesive Composition (D)
25 parts by weight of an alicyclic epoxy compound (celloxide C2021P), 25 parts by weight of 1,4-cyclohexane dimethanol diglycidyl ether, 45 parts by weight of 3-ethyl-3-[(3-ethyloxetane-3-yl)methoxymethyl]oxetane (ARON OXETANE DOX221 commercially available from Toagosei Co., Ltd) and 10 parts by weight of vinyltriethoxy silane were blended to prepare a composition. Then, 5 parts by weight of a cationic initiator (diphenyl-(4-phenylthio)phenylsulfonium hexafluorophosphate, CPI100P commercially available from Sanapro) was further blended, relative to 100 parts by weight of the solid content of the composition, to prepare an adhesive composition (D)

PREPARATIVE EXAMPLE 5

Preparation of Adhesive Composition (E)
25 parts by weight of an alicyclic epoxy compound (celloxide C2021P commercially available from Dicel), 25 parts by weight of 1,4-cyclohexane dimethanol diglycidyl ether, 45 parts by weight of 3-ethyl-3-[(3-ethyloxetane-3-yl)methoxymethyl]oxetane (ARON OXETANE DOX221 commercially available from Toagosei Co., Ltd) and 10 parts by weight of vinylacetate were blended to prepare a composition. Then, 5 parts by weight of a cationic initiator (diphenyl-(4-phenylthio)phenylsulfonium hexafluorophosphate, CPI100P commercially available from Sanapro) was further blended, relative to 100 parts by weight of the solid content of the composition, to prepare an adhesive composition (E).

PREPARATIVE EXAMPLE 6

Preparation of Adhesive Composition (F)
25 parts by weight of an alicyclic epoxy compound (celloxide C2021P commercially available from Dicel), 25 parts by weight of 1,4-cyclohexane dimethanol diglycidyl ether, 30 parts by weight of 3-ethyl-3-[(3-ethyloxetane-3-yl)methoxymethyl]oxetane (ARON OXETANE DOX221 commercially available from Toagosei Co., Ltd) and 20 parts by weight of vinyltriepoxy silane were blended to prepare a composition. Then, 5 parts by weight of a cationic initiator (diphenyl-(4-phenylthio)phenylsulfonium hexafluorophosphate, CPI100P commercially available from Sanapro) was further blended, relative to 100 parts by weight of the solid content of the composition, to prepare an adhesive composition (F).

PREPARATIVE EXAMPLE 7

Preparation of Liquid Crystal Layer (A)
A composition for forming a photo alignment layer was coated on one surface of a TAC substrate (refractive index: 1.49, thickness: 80,000 nm) so as for the coating layer to have a thickness of approximately 1,000 Å after being dried, and then dried at 80° C. for 2 minutes in an oven. In the above, as the composition for forming a photo alignment layer, a composition (polynorbornene:acryl monomer:photoinitiator=2:1:0.25 (weight ratio)) was used, which was prepared by mixing a mixture of an acrylic monomer and polynorbornene (molecular weight ($M_w$)=150,000) having a cinnamate group represented by the following Formula 15 with a photoinitiator (Irgacure 907) and then dissolving the mixture in a toluene solvent so that a solid content of the polynorbornene could amount to 2% by weight.

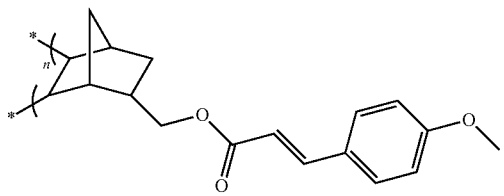

Formula 15

The dried composition for forming a photo alignment layer was aligned according to a method disclosed in Korean Patent Application No. 2010-0009723 so as to form a photo alignment layer including first and second alignment regions which were aligned in different directions. Specifically, a pattern mask in which light-transmitting portions and light-intercepting portions, each of them having stripe shapes having widths of approximately 450 μm, were alternately formed in both of a vertical and a horizontal direction was disposed on an upper side of the dried composition, and a polarizing plate having two regions formed therein capable of transmitting two different kinds of polarized light was also disposed on an upper portion of the pattern mask. Then, the composition for forming a photo alignment layer was aligned by irradiating the composition with UV rays (300 mW/cm$^2$) for approximately 30 seconds using the polarizing plate and the pattern mask while transferring the TAC substrate (30) having the photo alignment layer formed thereon at a rate of approximately 3 m/min. Then, a liquid crystal layer was formed on the alignment-treated alignment layer. Specifically, a liquid crystal composition including 70 parts by weight of a multifunctional polymerizable liquid crystal compound represented by the following Formula A, 30 parts by weight of a monofunctional polymerizable liquid crystal compound represented by the following Formula B, and an appropriate amount of a photoinitiator was coated on the photo alignment layer so as for the coating layer to have a thickness of approximately 1 μm after being dried, and then the liquid crystal composition was aligned according to alignment of the alignment layer under the liquid crystal layer. Then, a liquid crystal layer, which includes first and second aligned regions having different optical axes perpendicular to each other according to the alignment of the photo alignment layer under the liquid crystal layer, was formed by cross-linking and polymerizing liquid crystals by irradiating with UV rays (300 mW/cm$^2$) for approximately 10 seconds. In the liquid crystal layer, a difference between the refractive index in the in-plane slow axis direction and the refractive index in the in-plane fast axis direction was approximately 0.125.

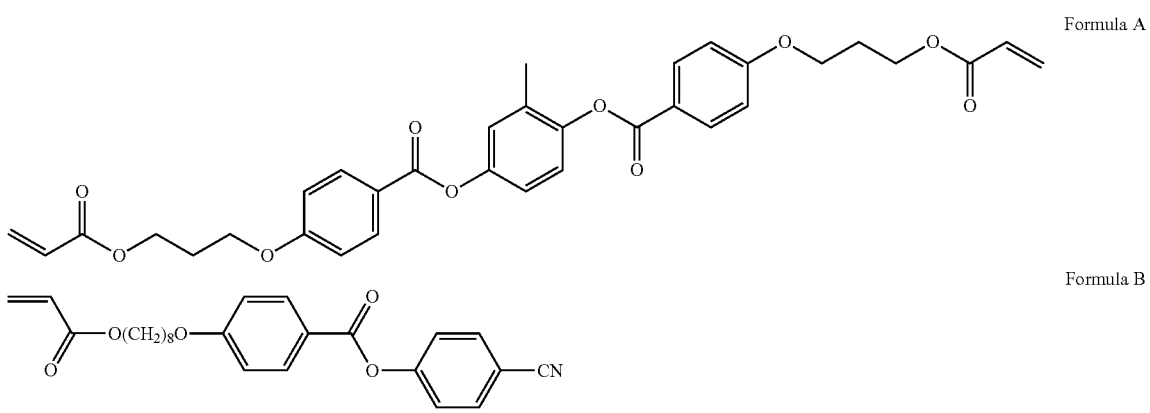

Formula A

Formula B

PREPARATIVE EXAMPLES 8 to 11

Preparation of Liquid Crystal Layer (B) to Liquid Crystal Layer (E)

Liquid crystal layers were prepared in the substantially same manner as in Preparative Example 7, except that a weight ratio of the multifunctional polymerizable liquid crystal compound and the monofunctional polymerizable liquid crystal compound included in the liquid crystal composition was adjusted as listed in the following Table 1.

TABLE 1

|  | Liquid crystal layer (B) | Liquid crystal layer (C) | Liquid crystal layer (D) | Liquid crystal layer (E) |
|---|---|---|---|---|
| Multifunctional polymerizable liquid crystal compound (A) | 55 | 45 | 40 | 10 |
| Monofunctional polymerizable liquid crystal compound (B) | 45 | 55 | 60 | 90 |
| Refractive index difference | 0.125 | 0.125 | 0.125 | 0.125 |
| Thickness (μm) | 1 | 1 | 1 | 1 |

Content unit: parts by weight

EXAMPLE 1

An optical device was manufactured as follows. First, the liquid crystal layer included in a structure prepared in Preparative Example 7, in which the TAC substrate, the alignment layer and the liquid crystal layer (A) were sequentially formed, was attached to the polarizer included in a polarizing plate, which included a PVA polarizer and a transparent protective film formed on one surface of the polarizer, by using the adhesive composition (A). Specifically, a surface of the liquid crystal layer was coated with the adhesive composition so as for the coating layer to have a thickness of 5 μm after being cured, and then the polarizer was laminated on the liquid crystal layer via the coating layer. Then, an adhesive layer was formed by irradiating it with UV rays of UV A regions from one surface of the transparent protective film (500 mJ/cm$^2$), and thereby the liquid crystal layer was attached to the polarizer. Thereafter, a conventional acrylic pressure-sensitive adhesive layer was formed on one surface of the transparent protective film of the polarizer to manufacture an optical device.

EXAMPLES 2 to 6

Each optical device was manufactured in the substantially same manner as in Example 1, except that the kinds of liquid crystal layers and adhesive compositions and the thickness of an adhesive layer to be formed were changed as listed in the following Table 2, and the UV irradiation conditions were adjusted to sufficiently cure the adhesive compositions.

TABLE 2

|  |  | Liquid crystal layers | Kinds of adhesive compositions | Adhesive layer thickness (μm) |
|---|---|---|---|---|
| Examples | 2 | Liquid crystal layer (A) | Adhesive composition (B) | 5 |
|  | 3 | Liquid crystal layer (A) | Adhesive composition (C) | 5 |
|  | 4 | Liquid crystal layer (A) | Adhesive composition (D) | 5 |
|  | 5 | Liquid crystal layer (A) | Adhesive composition (E) | 5 |
|  | 6 | Liquid crystal layer (B) | Adhesive composition (A) | 5 |

COMPARATIVE EXAMPLES 1 to 13

Optical devices were manufactured in the substantially same manner as in Example 1, except that the kinds of liquid crystal layers and adhesive compositions and the thickness of an adhesive layer to be formed were changed as listed in the following Table 3, and the UV irradiation conditions were adjusted to sufficiently cure the adhesive compositions.

TABLE 3

|  |  | Liquid crystal layers | Kinds of adhesive compositions | Adhesive layer thickness (μm) |
|---|---|---|---|---|
| Comparative Examples | 1 | Liquid crystal layer (D) | Adhesive composition (A) | 5 |
|  | 2 | Liquid crystal layer (D) | Adhesive composition (B) | 5 |
|  | 3 | Liquid crystal layer (D) | Adhesive composition (C) | 5 |
|  | 4 | Liquid crystal layer (D) | Adhesive composition (D) | 5 |

TABLE 3-continued

| | Liquid crystal layers | Kinds of adhesive compositions | Adhesive layer thickness (μm) |
|---|---|---|---|
| 5 | Liquid crystal layer (D) | Adhesive composition (E) | 5 |
| 6 | Liquid crystal layer (D) | Adhesive composition (F) | 5 |
| 7 | Liquid crystal layer (E) | Adhesive composition (A) | 5 |
| 8 | Liquid crystal layer (E) | Adhesive composition (B) | 5 |
| 9 | Liquid crystal layer (E) | Adhesive composition (C) | 5 |
| 10 | Liquid crystal layer (E) | Adhesive composition (D) | 5 |
| 11 | Liquid crystal layer (E) | Adhesive composition (E) | 5 |
| 12 | Liquid crystal layer (E) | Adhesive composition (F) | 5 |
| 13 | Liquid crystal layer (C) | Adhesive composition (A) | 5 |
| 14 | Liquid crystal layer (A) | Adhesive composition (F) | 5 |

The optical devices prepared in Examples and Comparative Examples were evaluated for physical properties using the above-described method. The evaluation results are listed in the following Tables 4 and 5, respectively.

TABLE 4

| | | The gel fractions (%) of the adhesive | Adhesion strength | Thermal shock property | Durability of liquid crystal layers | Initial phase difference (nm) | Changes in phase difference (after being kept for 100 hours) | |
|---|---|---|---|---|---|---|---|---|
| | | | | | | | Phase difference (nm) after being kept at heating conditions | Changes (%) |
| Examples | 1 | 95 | ○ | ○ | ○ | 125.4 | 119.7 | 4.5 |
| | 2 | 90 | ○ | ○ | ○ | 125.4 | 119.7 | 4.5 |
| | 3 | 90 | ○ | ○ | ○ | 125.4 | 119.7 | 4.5 |
| | 4 | 90 | ○ | ○ | ○ | 125.4 | 119.7 | 4.5 |
| | 5 | 90 | ○ | ○ | ○ | 125.4 | 119.7 | 4.5 |
| | 6 | 95 | ○ | ○ | ○ | 120.7 | 114.1 | 5.5 |

TABLE 5

| | | The gel fractions (%) of the adhesive | Adhesion strength | Thermal shock property | Durability of liquid crystal layers | Initial phase difference (nm) | Changes in phase difference (after being kept for 100 hours) | |
|---|---|---|---|---|---|---|---|---|
| | | | | | | | Phase difference (nm) after being kept at heating conditions | Changes (%) |
| Comparative Examples | 1 | 95 | X | ○ | X | 77.2 | 69.4 | 10.1 |
| | 2 | 90 | X | ○ | X | 77.2 | 69.4 | 10.1 |
| | 3 | 90 | X | ○ | X | 77.2 | 69.4 | 10.1 |
| | 4 | 90 | X | ○ | X | 77.2 | 69.4 | 10.1 |
| | 5 | 90 | X | X | X | 77.2 | 69.4 | 10.1 |
| | 6 | 70 | X | X | X | 77.2 | 69.4 | 10.1 |
| | 7 | 90 | X | ○ | X | — | — | — |
| | 8 | 90 | X | ○ | X | — | — | — |
| | 9 | 90 | X | ○ | X | — | — | — |
| | 10 | 90 | X | ○ | X | — | — | — |
| | 11 | 90 | X | ○ | X | — | — | — |
| | 12 | 70 | X | X | X | — | — | — |
| | 13 | 90 | X | ○ | X | 94.1 | 85.5 | 9.1 |
| | 14 | 70 | X | X | ○ | 125.4 | 119.7 | 4.5 |

—: A phase difference value cannot be measured since a liquid crystal layer is in a non-aligned state.

EXPERIMENTAL EXAMPLE 1

Evaluation of Refractive Index Relationship of Liquid Crystal Layer and Light Division Property According to Thickness In order to evaluate a light division property of the liquid crystal layer according to the thickness and the refractive index relationship thereof, samples were prepared, as will be described later. Specifically, liquid crystal layers were formed in the substantially same manner as in Preparative Example 7, except that the formulations of the liquid crystal compositions were controlled so as for the difference between the refractive index in the in-plane slow axis direction and the refractive index in the in-plane fast axis direction to be 0.03, and the thicknesses of the layer were controlled to be approximately 0.3 μm, 1 μm and 2.5 μm, respectively. Also, liquid crystal layers were formed in the same manner as in Preparative Example 7, except that the thicknesses of the layer were controlled to be approximately 0.3 μm and 2.5 μm, respectively. Also, liquid crystal layers were formed in the same manner as in Preparative Example 7, except that the formulations of the liquid crystal compositions were controlled so as for the difference between the refractive index in the in-plane slow axis direction and the refractive index in the in-plane fast axis direction to be 0.22, and the thicknesses of the layer were controlled to be approximately 0.3 μm, 1 μm and 2.5 μm, respectively. Thereafter, optical devices were prepared in the same manner as in Example 1 using the prepared liquid crystal layer, and crosstalk ratios measured when the prepared optical devices and the optical device of Example 1 were used to observe a stereoscopic image were evaluated. The results are listed in the following Table 6.

TABLE 6

| Liquid crystal layers of phase retardation layers | | |
|---|---|---|
| Refractive index difference* | Thickness (μm) | Crosstalk ratio (%) |
| 0.03 | 0.3 | 79.5 |
| 0.03 | 1 | 45.3 |
| 0.03 | 2.5 | 10.3 |
| 0.125 | 0.3 | 36 |
| 0.125 | 1 | 0.5 |
| 0.125 | 2.5 | 177.4 |
| 0.22 | 0.3 | 14.6 |
| 0.22 | 1 | 30.7 |
| 0.22 | 2.5 | 121.6 |

Refractive index difference represents a difference between in-plane refractive indexes of a liquid crystal layer in a slow axis direction and fast axis direction.

The optical device according to one embodiment may be a light-dividing device, for example, a device that can divide incident light into at least two kinds of light having different polarized states. For example, the optical device can be used to realize a stereoscopic image.

What is claimed is:

1. An optical device, comprising:
   an adhesive layer comprising an active energy ray-curable adhesive composition in a cured state comprising a cationically polymerizable compound; and
   a polarizer and a liquid crystal layer which are attached to each other by the adhesive layer,
   wherein the difference between the refractive index in the in-plane slow axis direction of the liquid crystal layer and the refractive index in the in-plane fast axis direction of the liquid crystal layer is from 0.05 to 0.2, and the liquid crystal layer has a thickness in a range from 0.5 μm to 2.0 μm; and
   wherein the liquid crystal layer comprises a multifunctional polymerizable liquid crystal compound and a monofunctional polymerizable liquid crystal compound, and the monofunctional polymerizable liquid crystal compound comprised in the liquid crystal layer is in an amount of greater than 0 parts by weight and not more than 100 parts by weight, relative to 100 parts by weight of the multifunctional polymerizable liquid crystal compound.

2. The optical device of claim 1, wherein the cationically polymerizable compound is at least one epoxy compound selected from the group consisting of alicyclic epoxy compound, aliphatic epoxy compound and aromatic epoxy compound.

3. The optical device of claim 1, wherein the cationically polymerizable compound comprises alicyclic epoxy compound and aliphatic epoxy compound.

4. The optical device of claim 2, wherein the alicyclic epoxy compound is an epoxycyclohexylmethyl epoxycyclohexanecarboxylate compound; an epoxycyclohexane carboxylate compound of alkanediol; an epoxycyclohexylmethyl ester compound of dicarboxylic acid; an epoxycyclohexylmethyl ether compound of polyethyleneglycol; an epoxycyclohexylmethyl ether compound of alkanediol; a diepoxytrispiro compound; a diepoxymonospiro compound; a vinylcyclohexene diepoxide compound; an epoxycyclopentyl ether compound; or a diepoxy tricyclo decane compound.

5. The optical device of claim 2, wherein the aliphatic epoxy compound is a polyglycidyl ether of aliphatic polyvalent alcohol; a polyglycidyl ether of an alkyleneoxide addition product of aliphatic polyvalent alcohol; a polyglycidyl ether of polyester polyol of aliphatic polyvalent alcohol and aliphatic polyvalent carboxylic acid; a polyglycidyl ether of aliphatic polyvalent carboxylic acid; a polyglycidyl ether of polyester polycarboxylic acid of aliphatic polyvalent alcohol and aliphatic polyvalent carboxylic acid; a dimer, oligomer or polymer obtained by vinyl polymerization of glycidyl acrylate or glycidyl methacrylate; or an oligomer or polymer obtained by vinyl polymerization of the glycidyl acrylate or glycidyl methacrylate with a vinyl monomer other than the glycidyl acrylate and glycidyl methacrylate.

6. The optical device of claim 2, wherein the aromatic epoxy compound is a bisphenol-type epoxy resin; a novolac-type epoxy resin; a cresol epoxy resin; or a resorcinol glycidyl ether.

7. The optical device of claim 1, wherein the adhesive layer further comprises a compound represented by the following Formula 11:

$$Si(R_1)_n(R_2)_{4-n} \quad \text{Formula 11}$$

wherein $R_1$ is an alkenyl group, a cyclic ether group or a vinyloxy group, or a functional group comprising the alkenyl group, the cyclic ether group or the vinyloxy group, $R_2$ is hydrogen, a hydroxyl group, an alkyl group or an alkoxy group, and n is a number ranging from 1 to 4.

8. The optical device of claim 7, wherein the adhesive layer comprises the compound represented by the Formula 11 in an amount of 0.1 to 5 parts by weight, relative to 100 parts by weight of the cationically polymerizable compound.

9. The optical device of claim 1, wherein the adhesive layer further comprises a cationic initiator.

10. The optical device of claim 1, wherein the adhesive layer further comprises an oxetane compound.

11. The optical device of claim 1, wherein the adhesive layer has a gel fraction of 80% or more, the gel fraction being measured according to the following Equation 1:

Gel fraction =B/A ×100 tm [Equation 1]

wherein A represents the weight of the adhesive layer, B represents the dry weight of the insoluble part of the adhesive layer which is obtained after dipping the adhesive layer having the weight of A in dimethylformamide at a room temperature for 48 hours.

12. The optical device of claim 1, wherein the adhesive layer has a glass transition temperature of 40° C. or more.

13. The optical device of claim 1, wherein the adhesive layer has a thickness of 6 μm or less.

14. The optical device of claim 1, wherein the polymerizable liquid crystal compound is a compound represented by the following Formula 13:

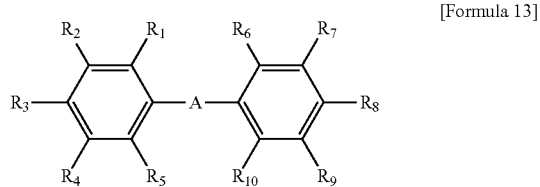

[Formula 13]

wherein A is a single bond, —COO— or —OCO—, and $R_1$ to $R_{10}$ are each independently hydrogen, a halogen, an alkyl group, an alkoxy group, an alkoxycarbonyl group, a cyano group, a nitro group, —O-Q-P or a substituent represented by the following Formula 14, or a pair of two adjacent substituents among $R_1$ to $R_5$ or a pair of two adjacent substituents among $R_6$ to $R_{10}$ is joined together to form a benzene ring substituted with —O-Q-P, provided that at least one of the $R_1$ to $R_{10}$ is —O-Q-P or the substituent of the Formula 14, or at least one pair of two adjacent substituents among $R_1$ to $R_5$ or among $R_6$ to $R_{10}$ is joined together to form a benzene ring substituted with —O-Q-P, where Q is an alkylene group or an alkylidene group, and P is an alkenyl group, an epoxy group, a cyano group, a carboxyl group, an acryloyl group, a methacryloyl group, an acryloyloxy group or a methacryloyloxy group;

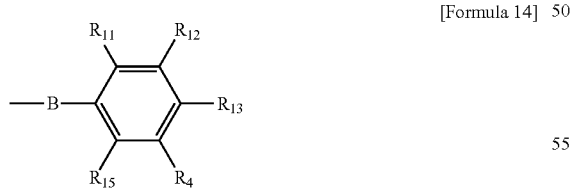

[Formula 14]

wherein the "-" indicated on the left side of B means that B directly binds to the benzene ring of Formula 13, B is a single bond, —COO— or —OCO—, and $R_{11}$ to $R_{15}$ are each independently hydrogen, a halogen, an alkyl group, an alkoxy group, an alkoxycarbonyl group, a cyano group, a nitro group or —O-Q-P, or a pair of two adjacent substituents among $R_{11}$ to $R_{15}$ is joined together to form a benzene ring substituted with —O-Q-P, provided that at least one of the $R_{11}$ to $R_{15}$ is —O-Q-P, or at least one pair of two adjacent substituents among $R_{11}$ to $R_{15}$ are joined together to form a benzene ring substituted with —O-Q-P, where Q is an alkylene group or an alkylidene group, and P is an alkenyl group, an epoxy group, a cyano group, a carboxyl group, an acryloyl group, a methacryloyl group, an acryloyloxy group or a methacryloyloxy group.

15. The optical device of claim 1, wherein the liquid crystal layer comprises a first region and a second region, the regions having different phase retardation properties to each other.

16. The optical device of claim 15, wherein the first and second regions have optical axes formed in different directions to each other.

17. The optical device of claim 16, wherein a bisector of an angle formed by the optical axes of the first region and the second region is formed vertically or horizontally to the absorption axis of the polarizer.

18. The optical device of claim 1, further comprising: a pressure-sensitive adhesive layer that is formed on a side opposite to the side, on which the adhesive layer is formed, of the polarizer,
wherein the pressure-sensitive adhesive layer has a storage modulus at 25° C. of 0.02 MPa to 0.08 MPa, and comprises a cross-linked structure of an acrylic polymer cross-linked by a multifunctional cross-linking agent.

19. The optical device of claim 1, further comprising: a pressure-sensitive adhesive layer that is formed on a side opposite to the side, on which the adhesive layer is formed, of the polarizer,
wherein the pressure-sensitive adhesive layer has a storage modulus at 25° C. of greater than 0.08 MPa, and comprises both of a cross-linked structure of an acrylic polymer cross-linked by a multifunctional cross-linking agent and a cross-linked structure of a polymerized active energy ray-polymerizable compound.

20. A stereoscopic image display device comprising the optical device of claim 1.

21. The stereoscopic image display device of claim 20, further comprising a display element configured to generate image signals for left and right eyes,
wherein the liquid crystal layer of the optical device comprises a first region and a second region, the regions having different phase retardation properties to each other; and
wherein the optical device is arranged on the display element so that the image signal for the left eye can pass through one region of the first and second regions and the image signal for the right eye can pass through the other region of the first and second regions.

* * * * *